US012801393B2

(12) United States Patent
Smith et al.

(10) Patent No.: US 12,801,393 B2
(45) Date of Patent: Nov. 17, 2026

(54) UTILIZING TOP OF RACK SWITCH CACHING FOR EXECUTING ARTIFICIAL INTELLIGENCE WORKLOADS

(71) Applicant: Dell Products L.P., Round Rock, TX (US)

(72) Inventors: Erik P. Smith, Douglas, MA (US); Mihai Lazar, Ottawa (CA); Jonathan Peter Streete, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 18/900,180

(22) Filed: Sep. 27, 2024

(65) Prior Publication Data

US 2026/0093497 A1 Apr. 2, 2026

(51) Int. Cl.
*G06F 9/38* (2018.01)
*G06F 13/40* (2006.01)

(52) U.S. Cl.
CPC ........ *G06F 9/3854* (2023.08); *G06F 13/4022* (2013.01)

(58) Field of Classification Search
CPC ........................... G06F 9/3854; G06F 13/4022
See application file for complete search history.

(56) References Cited

U.S. PATENT DOCUMENTS

| | | | |
|---|---|---|---|
| 11,436,017 | B2 | 9/2022 | Lin et al. |
| 2007/0005664 | A1 | 1/2007 | Kodavalla et al. |
| 2007/0067382 | A1 | 3/2007 | Sun |
| 2008/0086600 | A1 | 4/2008 | Qiao |
| 2020/0133864 | A1 | 4/2020 | Yang et al. |
| 2020/0409597 | A1 | 12/2020 | Ganesh et al. |
| 2021/0149805 | A1 | 5/2021 | Pinho et al. |
| 2021/0390053 | A1 | 12/2021 | Roberts |
| 2023/0094937 | A1 | 3/2023 | Arndt et al. |
| 2024/0028517 | A1 | 1/2024 | Odajima |
| 2025/0054200 | A1 | 2/2025 | Luo |
| 2025/0175532 | A1 | 5/2025 | Nguyen et al. |

OTHER PUBLICATIONS

Xu et al. "An Efficient Checkpointing System for Large Machine Learning Model Training", Workshops of the International Conference for High Performance Computing, Networking, Storage and Analysis, IEEE 2024 (Year: 2024).*
Mohan et al. "CheckFreq: Frequent, Fine-Grained DNN Checkpointing", 19th USENIX Conference on File and Storage Technologies, Feb. 23-25, 2021 (Year: 2021).*
Eisenman, Assaf et al., "Check-N-Run: a Checkpointing System for Training Deep Learning Recommendation Models", USENIX Symposium on Networked Systems Design and Implementation (NSDI) Apr. 4, 2022 (15 pages).

* cited by examiner

*Primary Examiner* — Wissam Rashid
(74) *Attorney, Agent, or Firm* — Chamberlain, Hrdlicka, White, Williams & Aughtry; Aly Z. Dossa

(57) ABSTRACT

A method for managing check pointing, including obtaining, by a general processing unit (GPU), checkpoint data associated with a workload, transferring, by the GPU, the checkpoint data to a cache in a top of rack (ToR) switch via a data processing unit (DPU), wherein the GPU and the DPU and located on a physical server and the ToR switch is operatively connected to the physical server, and resuming, by the GPU, execution of the workload after the transferring, wherein the ToR switch transmits the checkpoint data to a storage system that is external to the physical server and the ToR switch.

20 Claims, 14 Drawing Sheets

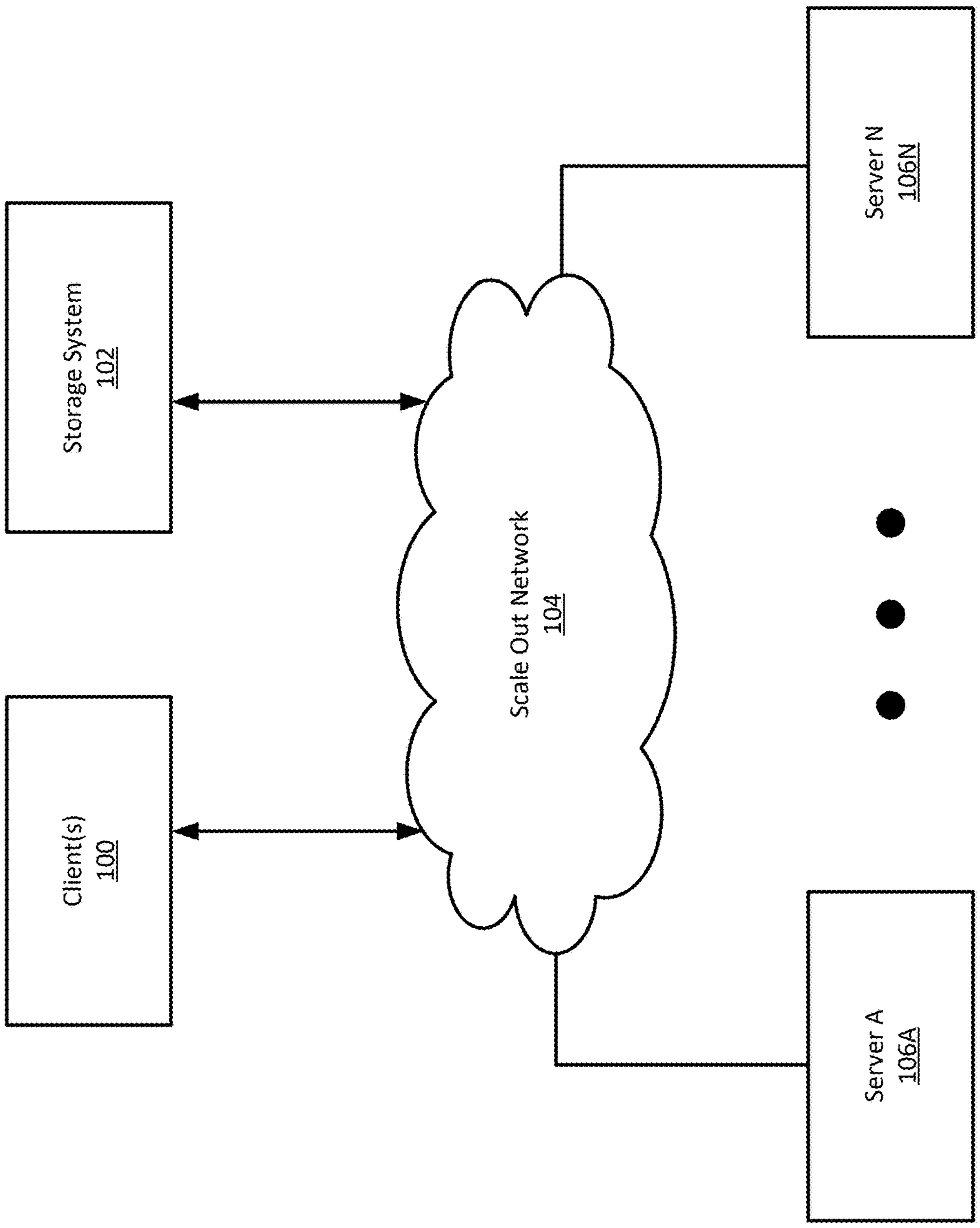
FIG.1.1

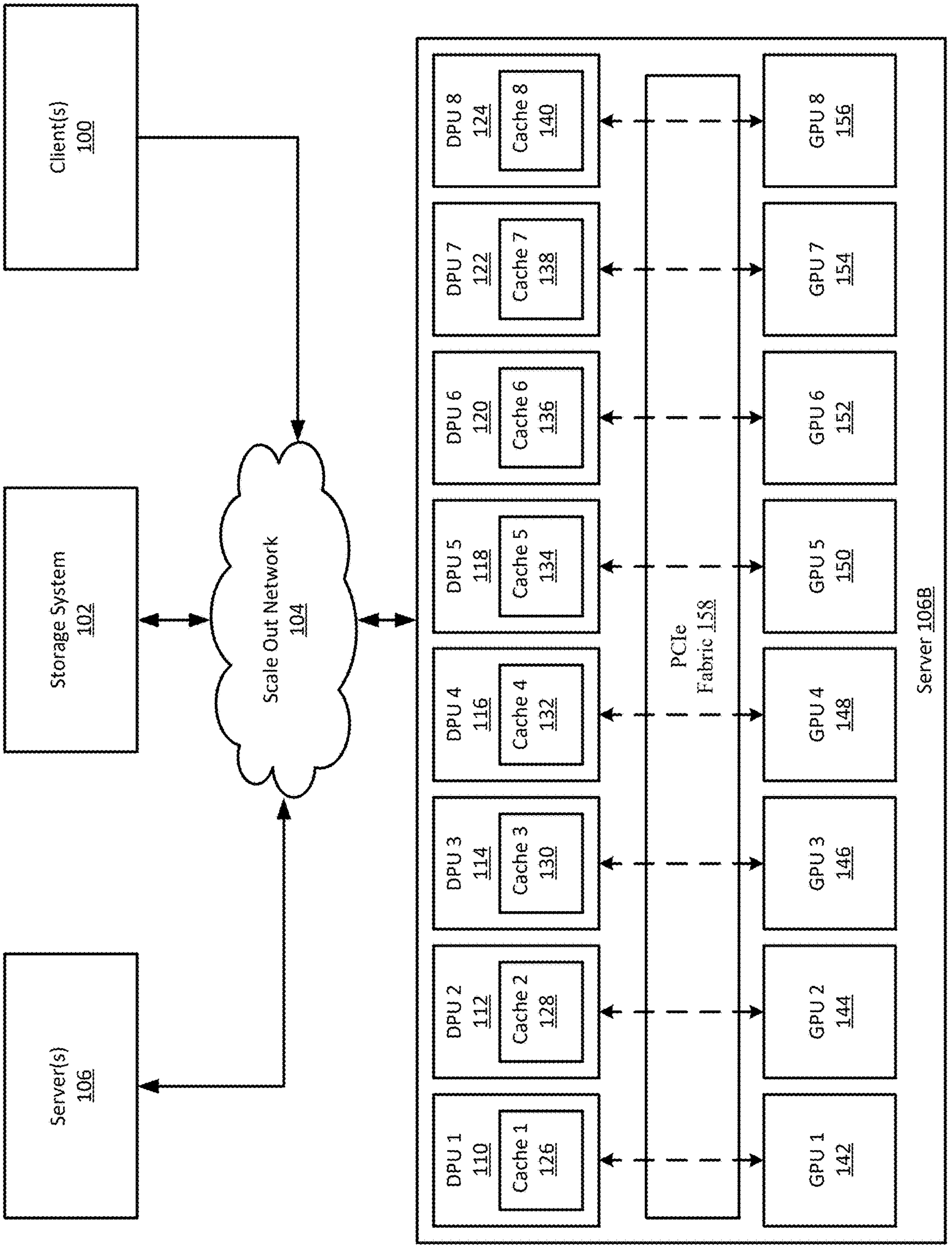
FIG. 1.2

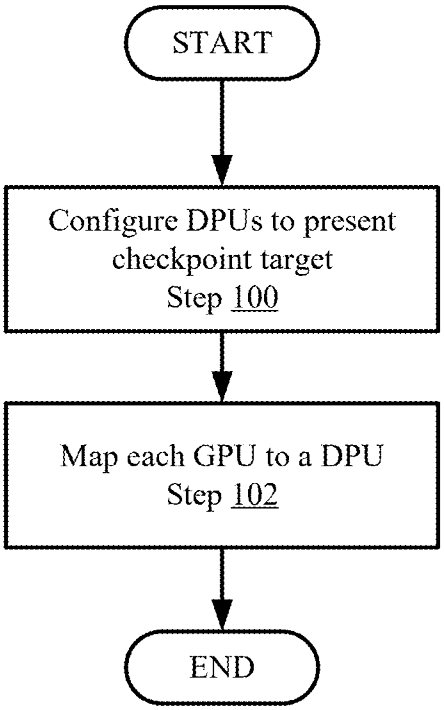
FIG. 1.3

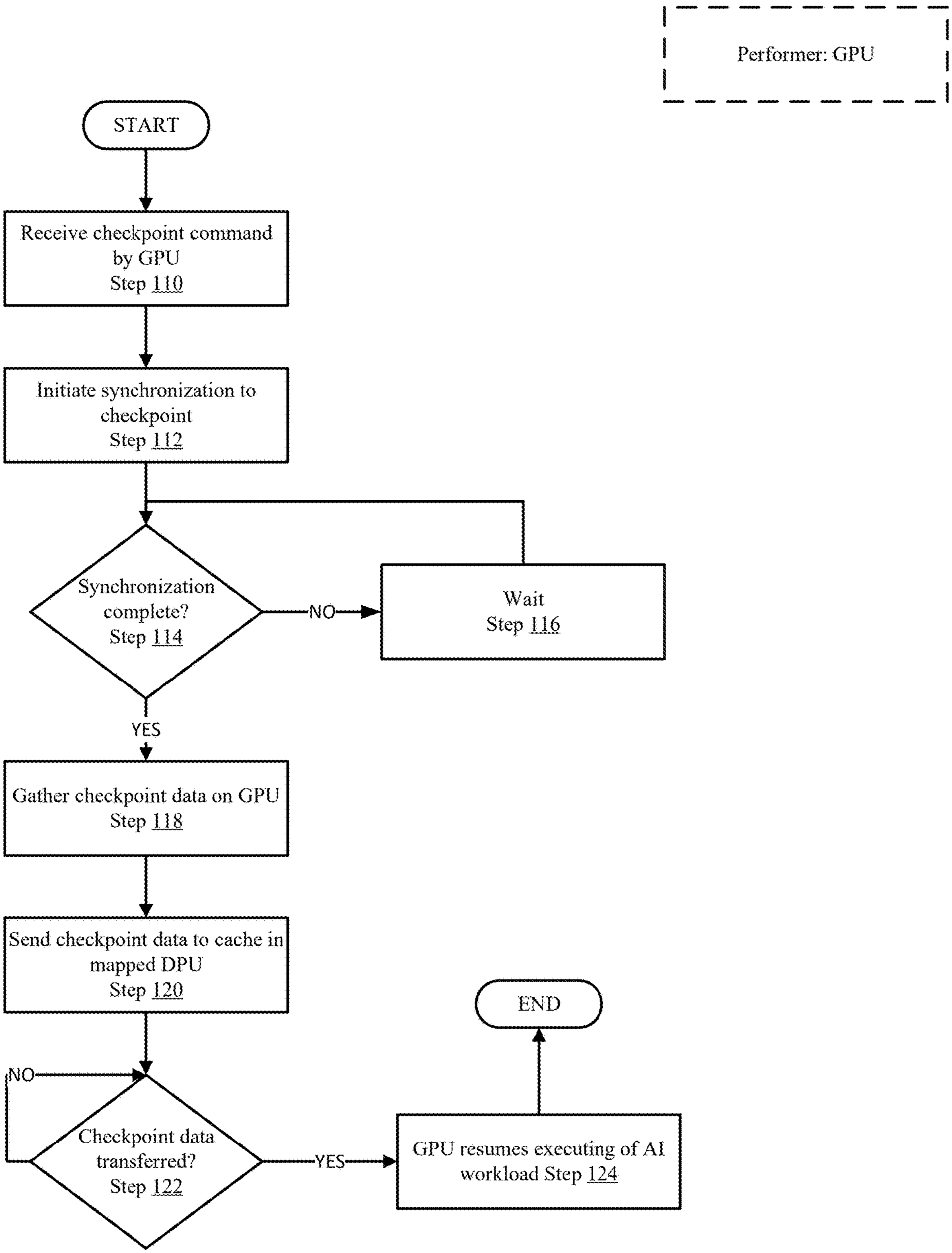
FIG. 1.4

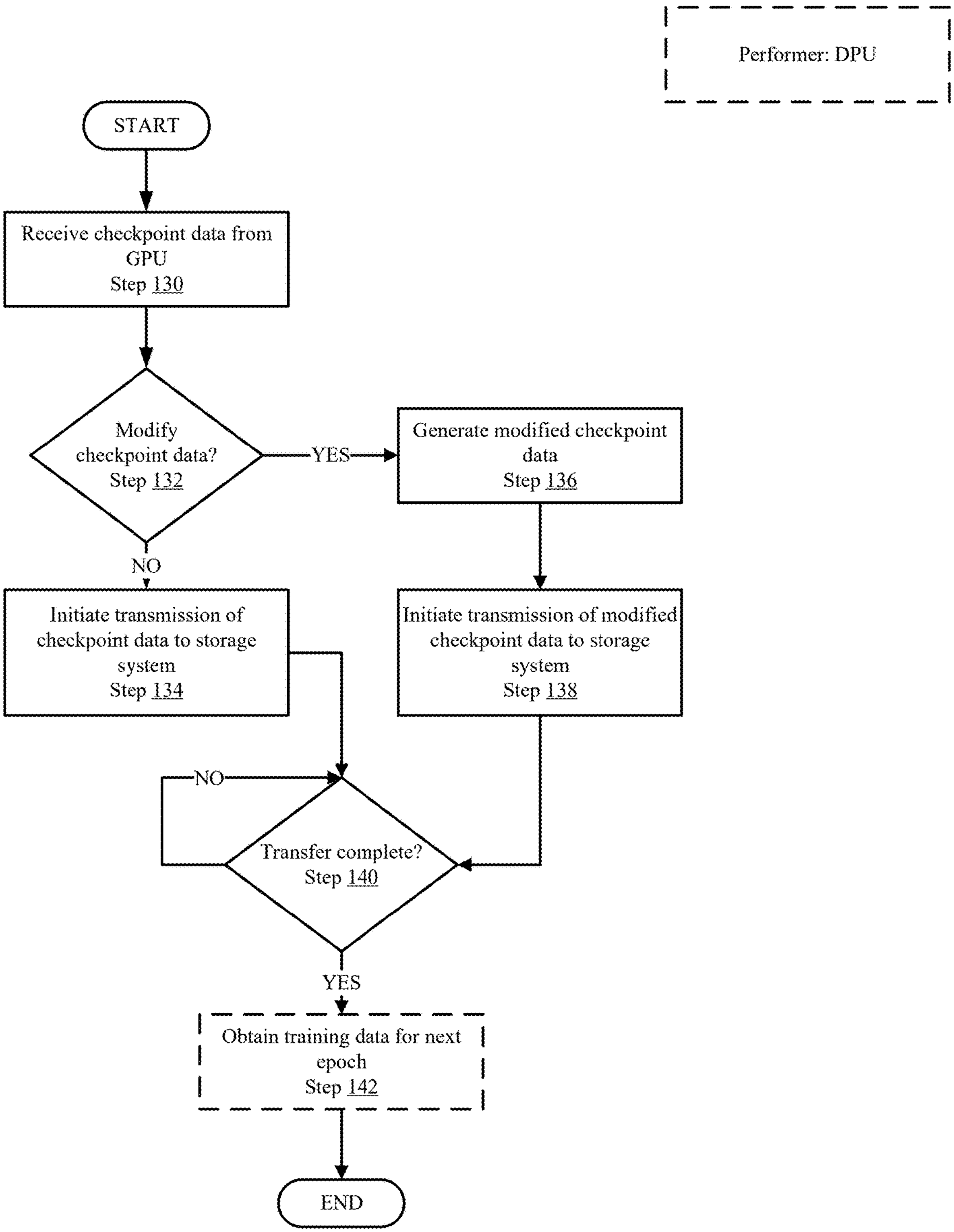
FIG. 1.5

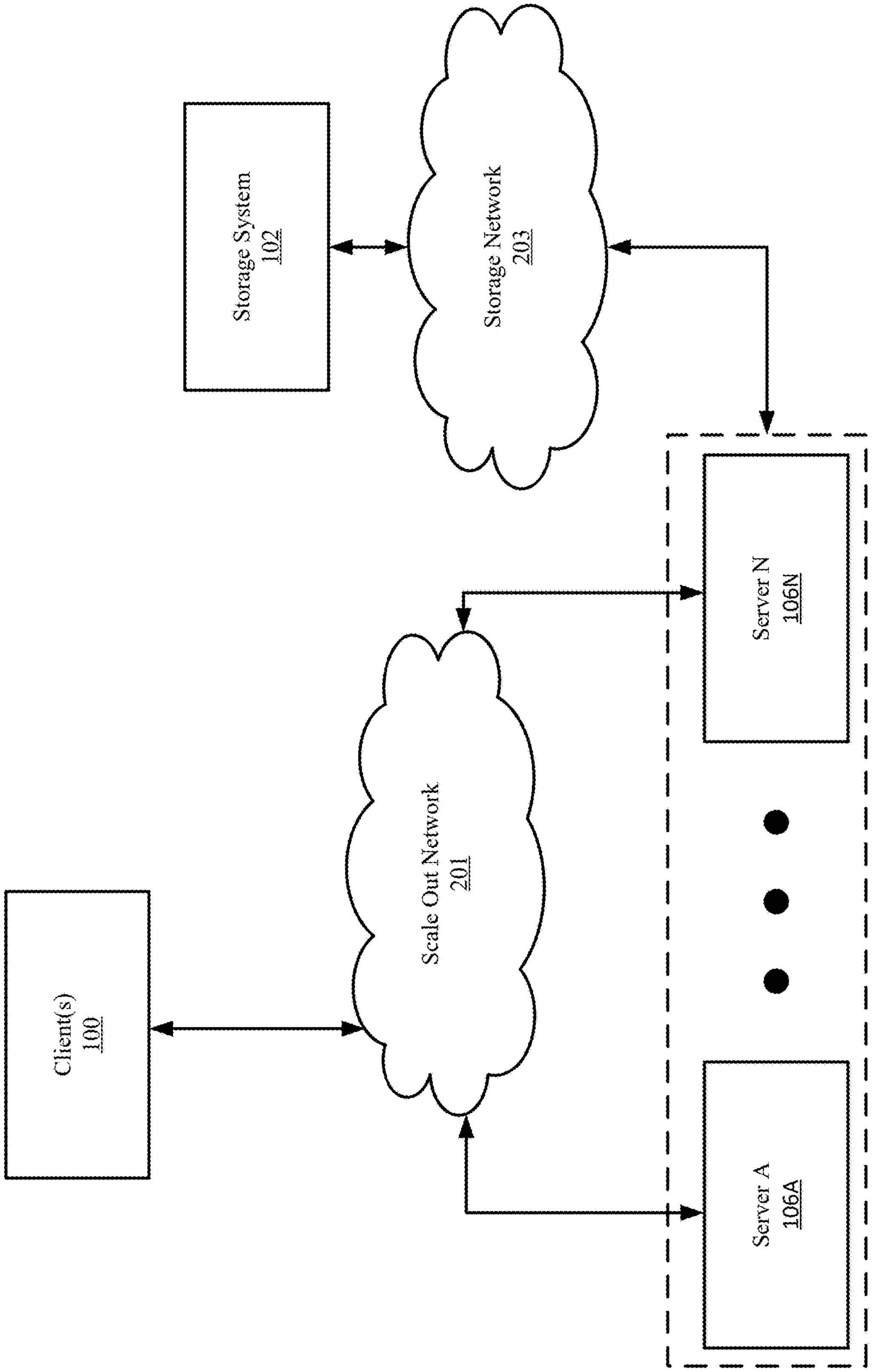
FIG. 2.1

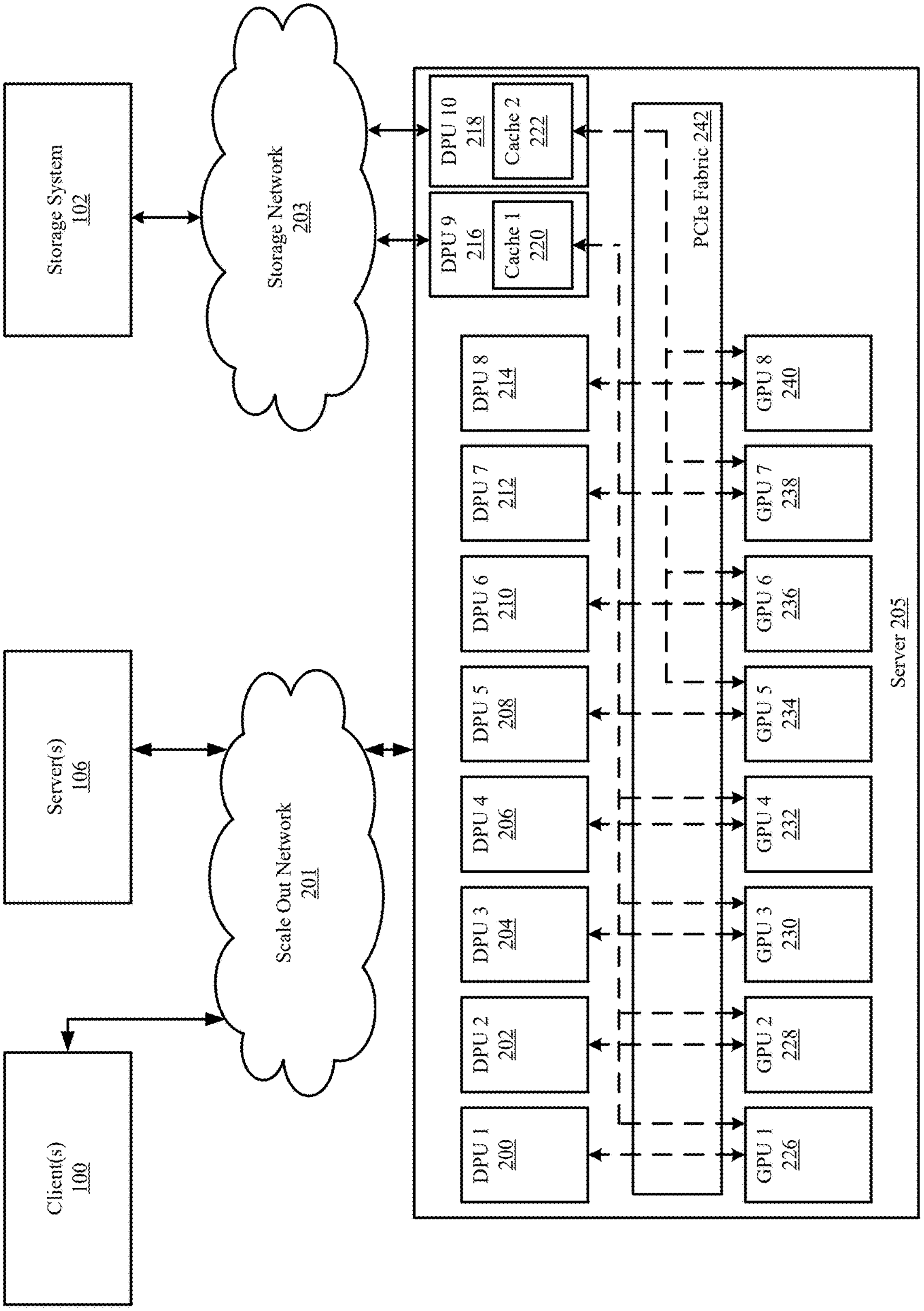
FIG. 2.2

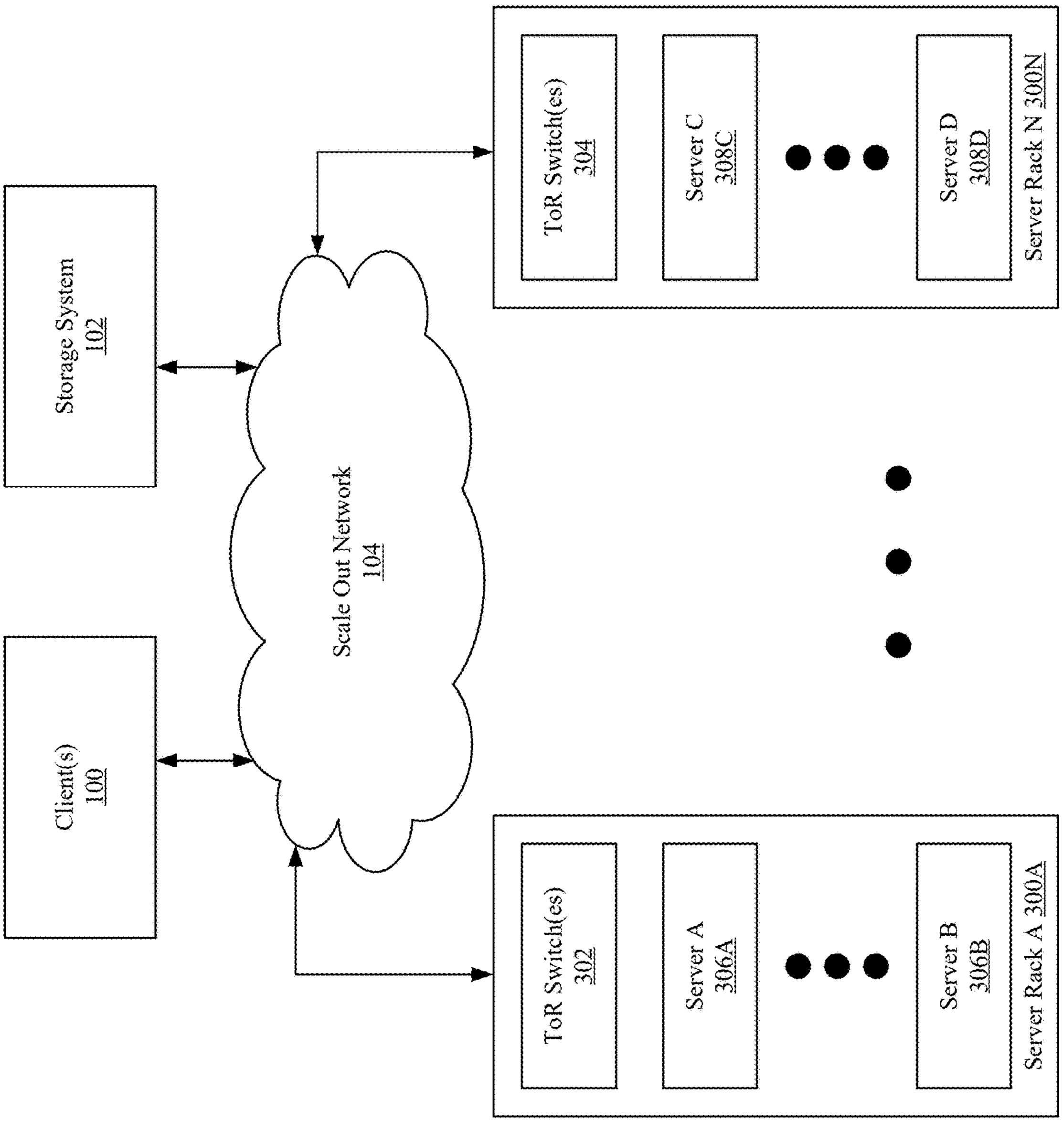
FIG. 3.1

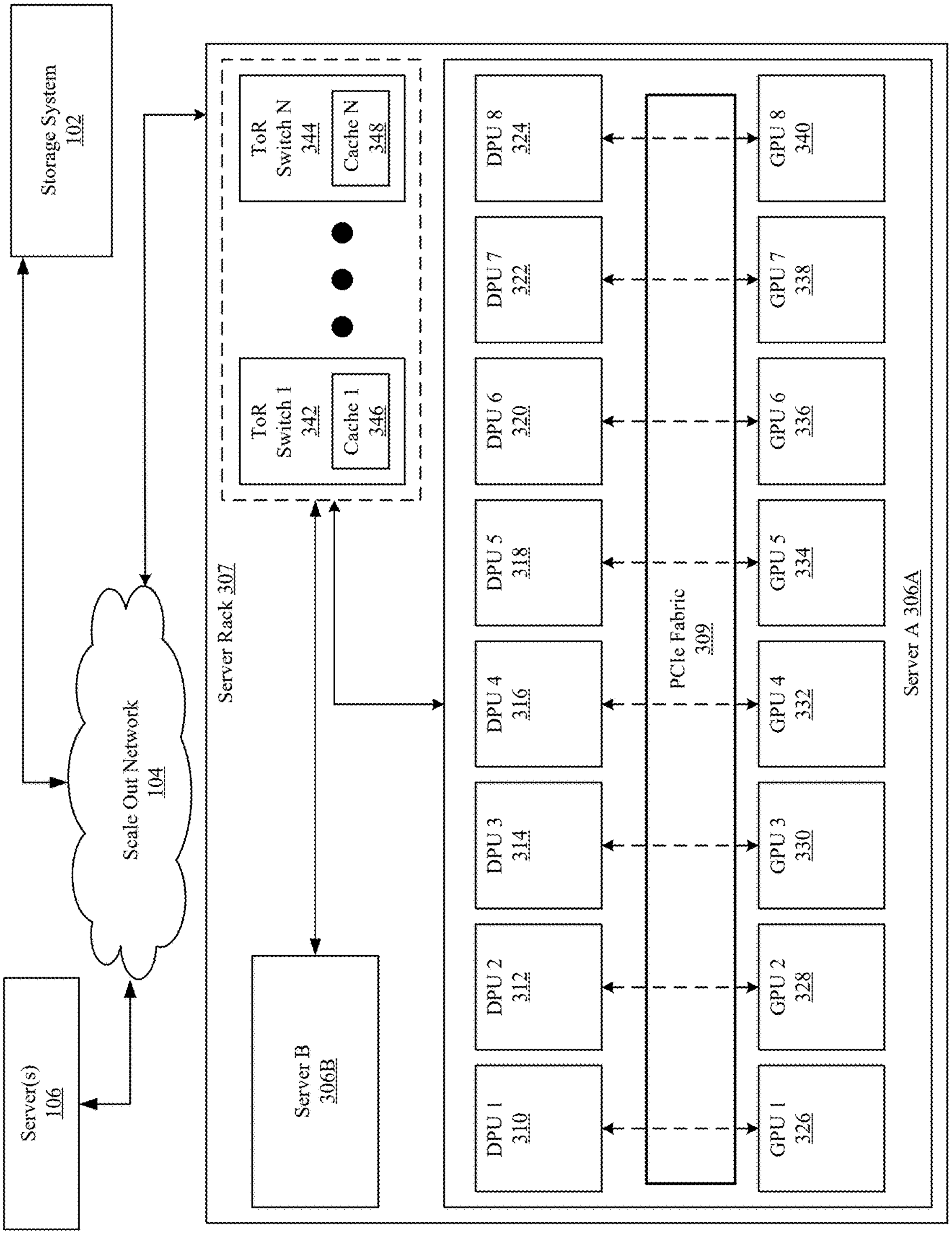
FIG. 3.2

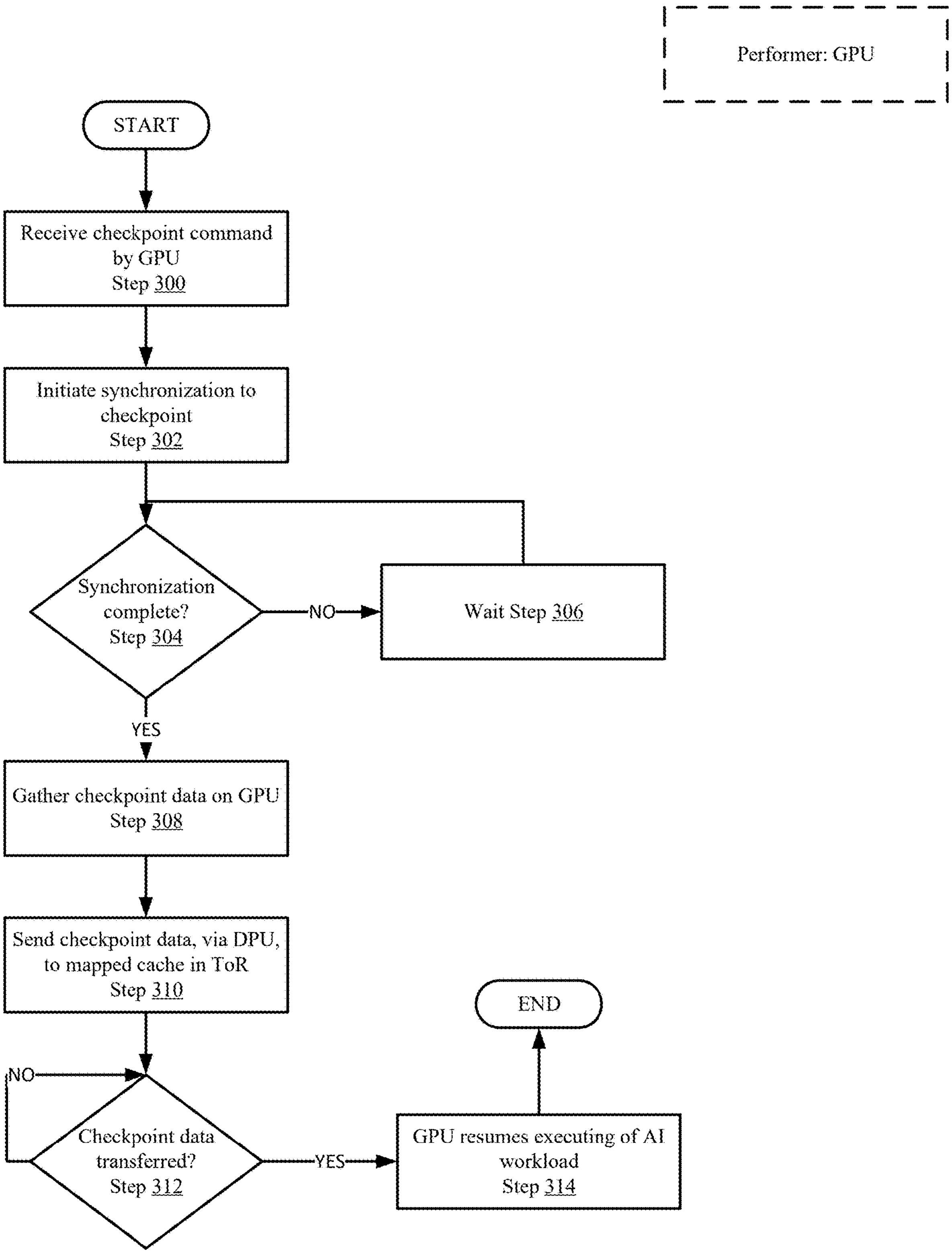
FIG. 3.3

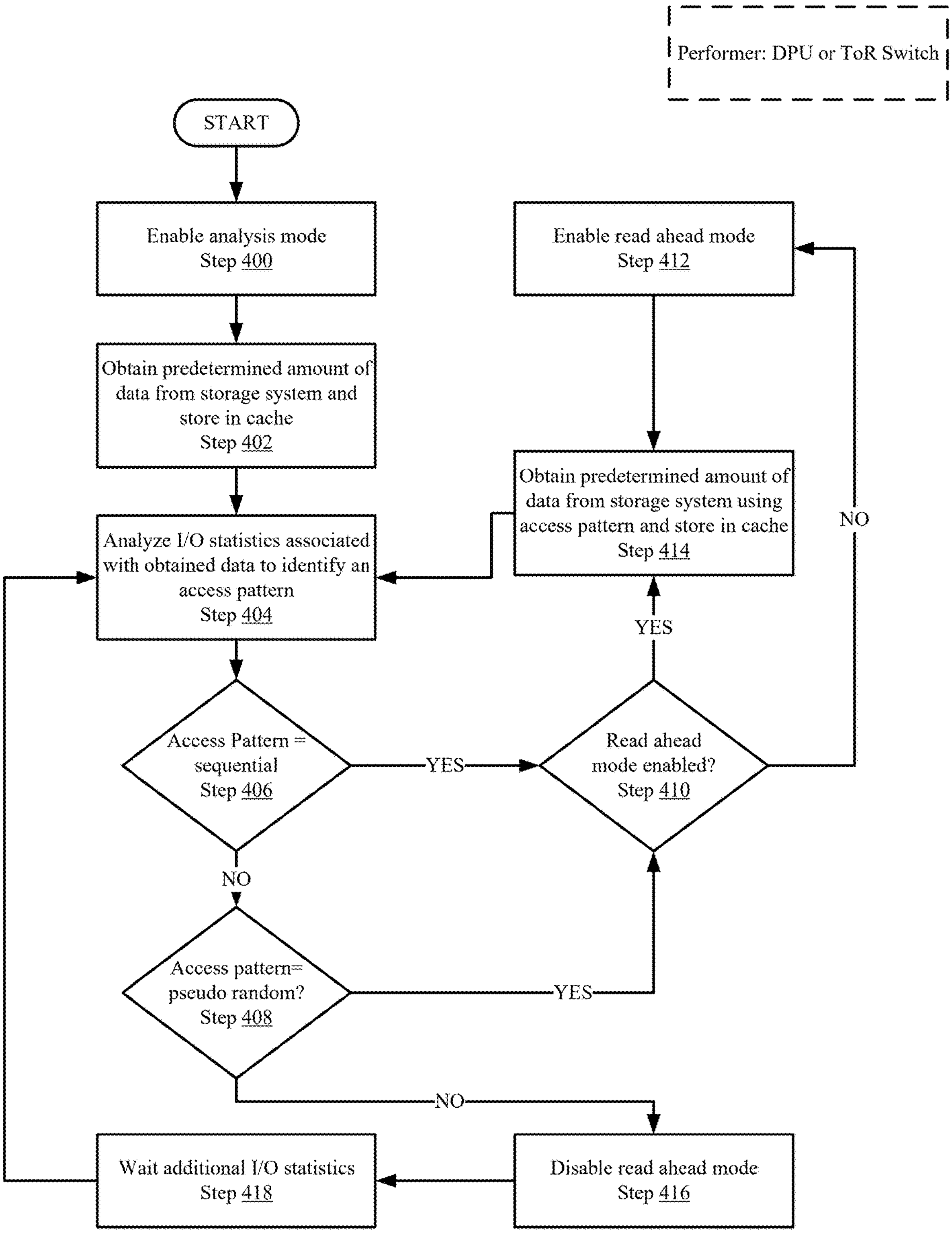
FIG. 4.1

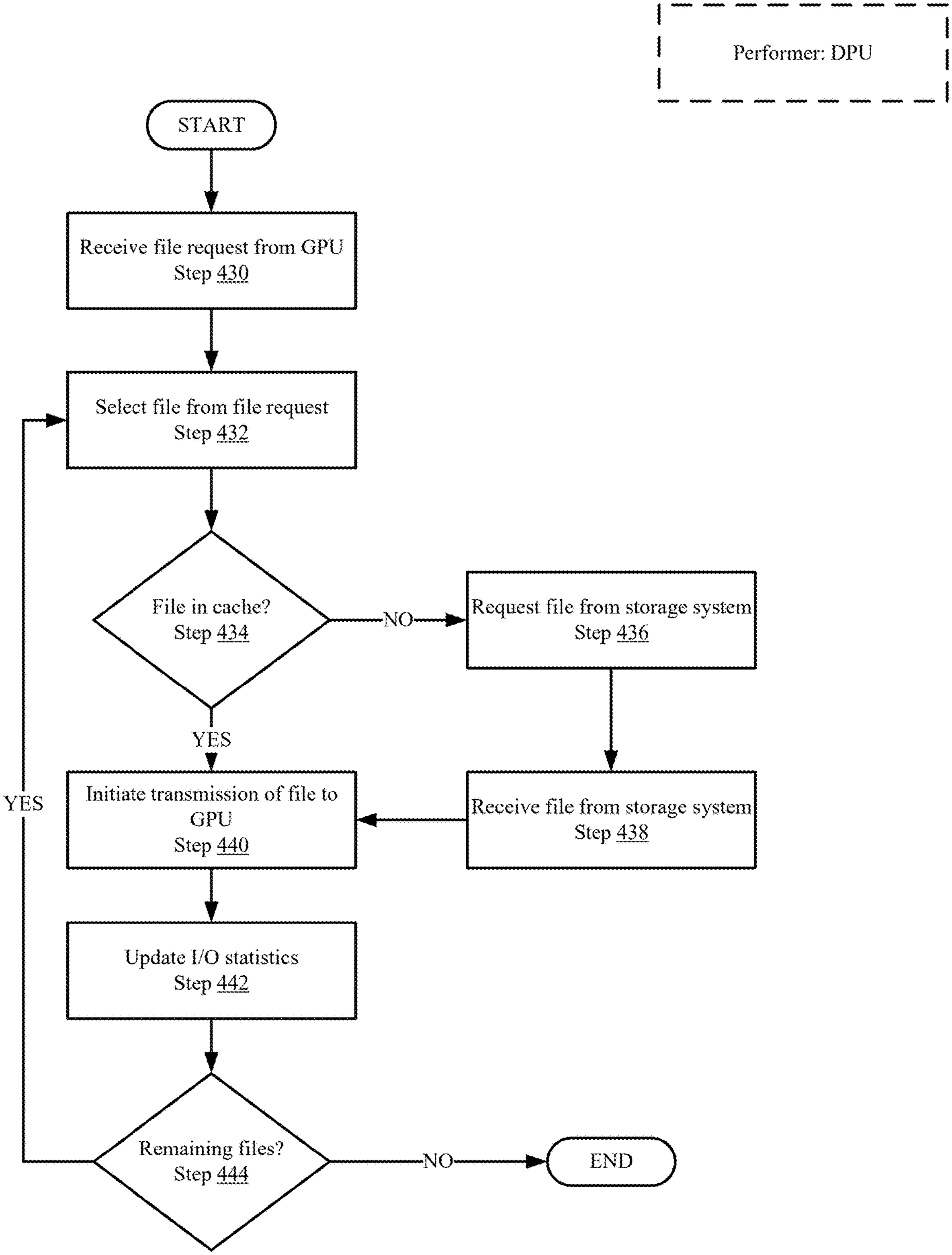
FIG. 4.2

UTILIZING TOP OF RACK SWITCH CACHING FOR EXECUTING ARTIFICIAL INTELLIGENCE WORKLOADS

BACKGROUND

The training of artificial intelligence (AI) model involves teaching a machine learning model to perform specific tasks by exposing it to large datasets and iteratively adjusting its parameters to minimize errors. During training, the model processes input data, makes predictions, and compares those predictions to the actual outcomes using, e.g., a loss function. Based on the loss, an optimization algorithm, e.g., as gradient descent, updates the model's parameters to improve its accuracy. This process is computationally intensive, particularly for deep learning models with millions or billions of parameters, and can take days or even weeks to complete, depending on the size and complexity of the model and dataset.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

FIG. 1.1 shows a system in accordance with one or more embodiments.

FIG. 1.2 shows system in accordance with one or more embodiments of the invention.

FIG. 1.3 shows a flowchart of a method for setting up a system accordance with one or more embodiments of the invention.

FIG. 1.4 shows a flowchart of a method for generating and storing checkpoint data in a cache in accordance with one or more embodiments of the invention.

FIG. 1.5 shows a flowchart of a method for transmitting checkpoint data from a cache to a storage system in accordance with one or more embodiments of the invention.

FIG. 2.1 shows a system in accordance with one or more embodiments.

FIG. 2.2 shows system in accordance with one or more embodiments of the invention.

FIG. 3.1 shows a system in accordance with one or more embodiments.

FIG. 3.2 shows system in accordance with one or more embodiments of the invention.

FIG. 3.3 shows a flowchart of a method for generating and storing checkpoint data in a cache in accordance with one or more embodiments of the invention.

FIG. 4.1 shows a flowchart of a method for implementing read ahead in a system in accordance with one or more embodiments of the invention.

FIG. 4.2 shows a flowchart of a method for obtaining training data in a system in accordance with one or more embodiments of the invention.

DETAILED DESCRIPTION

Figure 5:
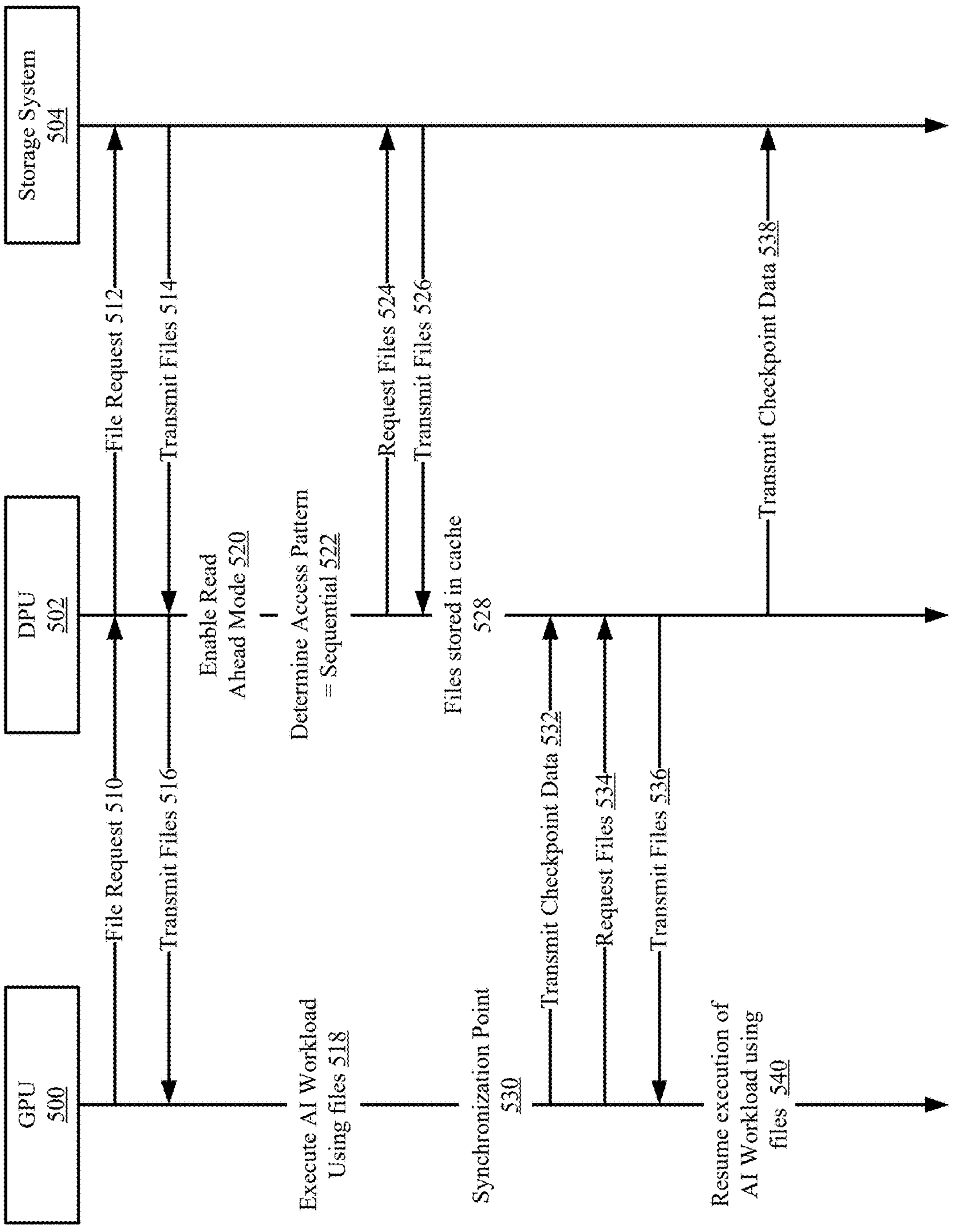
FIG. 5 shows an exemplary scenario for implementing checkpointing and reach ahead in a system in accordance with one or more embodiments of the invention.

Performance optimization in AI training is crucial for several reasons. First, it reduces the time and computational resources required to train a model, making the process more cost-effective and enabling quicker iteration and experimentation. This is especially important in research and industry, where faster training allows researchers or companies to test more models, try different hyperparameters, and achieve better results in shorter timeframes. Second, optimizing performance ensures that models can be trained on larger datasets and more complex architectures, which often leads to better accuracy and generalization. Ultimately, performance optimizations are key to advancing AI capabilities while keeping the process manageable and affordable.

AI training involves many processes. Two such processes that have an impact on performance on AI training are AI checkpointing and loading of training data into the graphical processing units (GPUs). AI checkpointing refers to the process of saving the intermediate states or parameters (also referred to as checkpoint data) of an AI model during training at regular intervals. This allows the training process to be paused and resumed from a saved point without having to start over, ensuring that progress is not lost due to interruptions, e.g., due to hardware failure, time limits, or other constraints. It is a crucial aspect of training large and complex models, particularly in deep learning, where training can take a long time and involve extremely large datasets. Inherent in AI checkpointing is the pausing of training on the GPU while the checkpoint data is being gathered and transmitted to persistent storage.

The amount of time that a given GPU is paused is directly related to the amount of time it takes to transmit the checkpoint data from the GPU to persistent storage, where the persistent storage may be located on a system that is external to the server on which the GPU is executing. The amount of time required is most significantly affected (or impacted) by latency in the network path (which may include multiple hops) between the server on which the GPUs are executing and the storage system. Any decrease in the amount of time a GPU is paused during the AI checkpointing process will improve the utilization of the GPU and, as a result, decrease the amount of time it takes to, e.g., train an AI model and decrease the amount of resources expended to train the AI model. For example, consider a scenario in which there are 128 GPUs executing on 16 servers training a 70B parameter AI model. Such a system currently takes 24 days to train the AI model with an aggregate power consumption of 100.5 MWh. If there was one hour of time savings per days (i.e., the GPU was executing for one hour more per day as opposed to be paused for checkpointing), then the training of the 70B AI model would only take 23 days and result in a power savings of up to 4.2 MWh.

As discussed above, the other process that has an impact on the performance of training AI models is loading data from the storage system into the GPUs. For large language models, the amount of data that is loaded onto a GPU for a given epoch can be 40 GB (or more). While this data is being loaded into the GPU, the GPU is idle (i.e., not performing any training). As such, it is preferable to load the GPUs as fast as possible. One of the performance bottlenecks for loading data from the storage system is the storage system input/output (I/O) bitrate. For example, the typically storage system I/O bitrate is 5 GB/s while the network connection bit rate is typically 50 GB/s. Given that the AI models are trained using large numbers of GPUs (e.g., 128 in the prior example) and the training data is typically located on a single storage system, the negative performance impact of the relatively slow bitrate is multiplied. Any decrease in the time it takes to load data into the GPUs will result in more efficient usage of GPUs (and related resources) and the faster AI models may be trained. Those skilled in the art will appreciate that the issues related to the loading of data on the GPUs for training are similar to the issues of loading data on to GPUs to perform inferencing using trained AI models.

Embodiments are directed to optimizing the training of AI model on graphical processing units (GPUs) using two approaches. The first optimization focuses on reducing the time required for a GPU to generate and store checkpoint data by using one or more local caches to temporarily store the checkpoint data and then asynchronously transferring the checkpoint data from the local caches to the storage system (see e.g., FIG. 1.1-3.3). The second optimization focuses on reading ahead (or pre-caching) data that will be used for training (or for inferencing) (See e.g., FIG. 4.1-4.2). While the optimizations may be implemented independently, the optimizations may also be implemented concurrently. See e.g., FIG. 5.

The following describes one or more embodiments. While the following describes using caches (or storage) in DPUs and Top of Rack (ToR) switches, embodiments of the invention may be implemented using other caches that are operatively connected to the GPUs without departing from the invention. Further, while the following describes embodiments of the invention in the context of AI workloads, embodiments of the invention may be implemented for any other types of workloads without departing from the invention.

DPU Caching of Checkpoint Data

As discussed above, in one or more embodiments of the invention, the DPUs in the server include caches. These caches are sized such that they can temporarily store checkpoint data generated by the GPUs. In this manner, the GPUs only need to be paused for the time it takes to obtain the checkpoint data and then transmit this checkpoint data to the corresponding DPU (which may be mapped 1:1 or 1:N to the GPUs) via the PCIe fabric. Once the checkpoint data has been stored in the cache, the GPUs can resume execution of the AI workload. By locally storing the checkpoint data in the cache, the GPUs can resume operation prior the checkpoint data being stored in the storage system. As a result, the performance bottleneck to store the checkpoint data, in one or more embodiments of the invention, is the bit rate of the PCIe fabric instead of the bit rate of the network connection(s) between the server on which the GPU is executing and the storage system. Further, the servers, in one or more embodiments, may use a PCIe switch between the GPU and DPU, which enables all GPUs to independently transmit to their respective DPU without sharing any PCIe resources with the other GPUs, eliminating other performance bottlenecks. FIG. 1.1-2.2 described various embodiments related to implementing DPU caching.

FIG. 1.1 shows a system in accordance with one or more embodiments. The system includes one or more clients (100), a storage system (102), one or more servers (e.g., server A (106A), server N (106N)), and a scale out network (104). The system may include additional, fewer, and/or different components without departing from the scope of the invention. Each of these system components is described below.

In one or more embodiments, the client(s) (100) includes functionality to initiate AI model training and/or AI inferencing applications on one or more servers. Further, the client may include functionality to monitor the status of the AI training and/or receive the results of AI inferencing applications. In one or more embodiments disclosed herein, the client(s) (100) may be a physical device (see e.g., FIG. 6) such as, e.g., a laptop, a cell phone, a tablet computer, a server, etc. In another embodiment of the invention, the client(s) (100) may be implemented on a virtual device (e.g., a virtual machine executing on one or more physical devices).

In one or more embodiments, the storage system (102) includes functionality to store checkpoint data (see e.g., FIGS. 1.4, 1.5, and 3.3) and data used for AI model training and AI inferencing (see e.g., FIGS. 4.1 and 4.2). The storage system may be implemented as a file store. When implemented as a file store, the storage system stores data as files and manages the files using a file system. The file system may organize the files within a hierarchy using, e.g., directories and/or folders. In another embodiment, the storage system may be implemented as an object store. When implemented as an object store, the data is stored as discrete units called objects (instead of files). Each object includes the data itself, metadata that describes the data, and a unique identifier, allowing for efficient retrieval and organization. The storage system includes functionality to perform at least some of steps described in FIGS. 1.5 and 4.1.

The storage system (102) may be implemented using one or more computing devices (see e.g., FIG. 6) and may utilize volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), and persistent memory (PMEM).

In one or more embodiments, the servers (106A, 106N) include functionality to execute AI workloads, e.g., AI training workloads and AI inferencing workloads. Each server may include a local AI application (not shown) that manages the execution of the various AI workloads on the GPUs in the server (see e.g., FIGS. 1.2, 2.2, 3.2). Additional detail about the servers is described below, see e.g., FIGS. 1.2, 2.2, and 3.2). The servers (106A, 106N) may operatively connected to each other via a ToR switch when the servers are in the same server rack (see e.g., FIG. 3.1) or via a scale out network (104) when the servers are in different server racks and/or in different geographic locations.

In one or more embodiments, the client(s) (100), the storage system (102), and the servers (106A, 106N) are connected to each other via a scale out network (104). In one or more embodiments, a scale out network is a distributed networking architecture designed to handle increases in data traffic and workloads by adding more resources, e.g., servers and switches. The components in the scale out network are connected via a network fabric (not shown). A network fabric refers to the interconnected topology and structure of network elements in the scale out network (104), e.g., switches, routers, and links, which work together to provide high-speed, low-latency data transmission within a data center or distributed network environment. The network fabric may be implemented using a spine-leaf topology, where every leaf switch connects to each spine switch. The client(s), storage systems and servers may directly connect to the leaf switches in the scale out network via one or more ToR switches (not shown). Those skilled in the art will appreciate that while FIG. 1.1, 1.2, 2.1, 2.2, 3.1, 3.2 show a scale out network, any other type of network (or network topology) may be used without departing from the invention.

FIG. 1.2 shows system in accordance with one or more embodiments of the invention. More specifically, FIG. 1.2 shows additional details about servers (e.g., 106B) in accordance with one or more embodiments of the invention. Turning to server (106B), the server (106B) is a physical device, such as the computing device shown in FIG. 6, and may include a set of data processing units (DPUs) (e.g., 110, 112, 114, 116, 118, 120, 122, 124) operatively connected to a set of GPUs (e.g., 142, 144, 146, 148, 150, 152, 154, 156) via a Peripheral Component Interconnect express (PCIe) fabric (158). The PCIe fabric is a high-speed, point-to-point interconnect architecture that allows GPUs and the DPUs (as well as other hardware components (not shown) in the server) to communicate directly with each other using the PCIe protocol and one or more PCIe switches. The DPUs and the GPUs communicate and/or transmit data to each other via the PCIe fabric using PCIe interfaces located on the DPUs and GPUs. In another embodiment, a Compute Express Link (CXL) bus, or other interconnect technologies, may be used to connect the GPU and associated DPU(s).

In one or more embodiments, a GPU (e.g., 142, 144, 146, 148, 150, 152, 154, 156) is a specialized electronic component that includes multiple cores (also referred to as GPU cores) arranged to enable high-performance parallel computing tasks. The GPUs also include large amounts of volatile memory (e.g., memory sufficient to store 80 GB of data) to support the parallel processing of the multiple GPU cores. For AI model training and AI inferencing, the GPUs also include functionality to perform all or some of the methods shown in FIGS. 1.3, 1.4, and 3.3). The GPU can implement additional functionality without departing from the invention.

In one or more embodiments, a DPU (e.g., 110, 112, 114, 116, 118, 120, 122, 124) is a specialized electronic component that includes one or more network interfaces and is designed to offload various networking tasks (e.g., packet processing, encryption, data compression, and network virtualization) from the server's CPU (not shown). Each of the DPUs include local volatile storage in the form of a cache (e.g., 126, 128, 130, 132, 134, 136, 138, 140). Those skilled in the art will appreciate that the cache may be implemented using any other form of volatile and/or non-volatile storage (e.g., random access memory, flash memory, magnetic memory, etc.) without departing from the invention. Each of the DPUs are mapped 1:1 to a GPU. For example, GPU 1 (142) is mapped to DPU 1 (110). Once mapped, the cache (e.g., 126) in DPU 1 is used to store checkpoint data from GPU 1 (see e.g., FIG. 1.4, 1.5, 3.3, 5) as well as data that is to be used by the GPU for AI model training and/or AI inferencing (see e.g., FIG. 4.1, 4.2, 5). For AI model training and AI inferencing, the DPUs also include functionality to perform all or some of the methods shown in FIG. 1.3, 1.4, 1.5, 3.3, 4.1, 4.2). The DPU can implement additional functionality without departing from the invention.

In one embodiment of the invention, the size of the cache in a DPU needs to be sufficient to store the checkpoint data that the mapped GPU generates at each checkpoint. In one implementation the size of the checkpoint data is 50% of the volatile storage (or memory capacity) of the GPU. In this scenario, the DPU cache needs to be at least this size. For example, if the GPU 1 (142) has a memory capacity of 80 GB, then the checkpoint data at a given checkpoint would be 40 GB. Accordingly, the size of the cache (i.e., cache 1 (126)) in the mapped DPU (i.e., DPU 1 (142)) is at least 40 GB. However, if the GPU is able to compress the checkpoint data, then the size of the cache in the mapped DPU may be less than 40 GB. While the above example states that the checkpoint data is 50% of the memory capacity of the GPU, those skilled in the art will appreciate that the checkpoint data may be more or less than 50% of the memory capacity of the GPU without departing from the invention. As discussed in FIG. 2.2, if more than one GPU is mapped to a given DPU then the size of the cache in the DPU may need to be larger.

Though not shown in FIG. 1.2, the server (106B) also includes other hardware components such as e.g., processors, volatile storage (e.g., memory), non-volatile storage (e.g., disk drives, solid state drives, etc.).

The server (106B) communicates with, transmits data to, and/or receives data from other servers (106) and the storage system (102) via the scale out network (104).

The other components shown in FIG. 1.2 have the same or substantially the same functionality as the like named components shown in FIG. 1.1.

FIG. 1.3 shows a flowchart of a method for setting up a system accordance with one or more embodiments of the invention. All or a portion of the method shown in FIG. 1.3 may be performed by the DPUs and GPUs. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 100, the DPUs are configured to present a checkpoint target to the GPUs. In one embodiment of the invention, the checkpoint target is storage location in which the GPU can store checkpoint data. In a first example, referring to FIG. 1.2, DPU 1 (110) may present cache 1 (126) or a location in cache 1 (126) as a checkpoint target. In a second example, referring to FIG. 2.2, DPU 9 (216) may present cache 9 (220) or a location in cache 9 (220) as a checkpoint target. In a third example, referring to FIG. 3.2, DPU 1 (310) may present cache 1 (346), a location in cache 1 (346), cache N (348), or a location in cache N (348) as a checkpoint target.

In one embodiment of the invention, the checkpoint target is a storage target. In another embodiment of the invention, the checkpoint target is a direct memory access target.

The DPU may use any known or later discovered method to present the GPU with the checkpoint target without departing from the invention. Further, the DPU may use any known or later discovered storage and/or communication protocol to present the checkpoint target without departing from the invention.

In step 102, once the DPUs are configured to present the checkpoint targets, the GPUs are mapped to the checkpoint targets. Said another way, the GPU is configured to use one of the presented checkpoint targets to storage checkpoint data. For example, referring to FIG. 1.2, GPU 1 (126) may be able to view (via the PCIe fabric) (158) all of the checkpoint targets presented by all of the DPUs (e.g., 126, 128, 130, 132, 134, 136, 138, 140); however, each GPU is mapped to a single DPU. In this example, GPU 1 (126) is mapped to DPU 1 (110). The result of the mapping is that the checkpoint data from GPU 1 will be stored in the checkpoint target presented by DPU 1 (i.e., cache 1 (126)). The storage process is described below with respect to, e.g., FIG. 1.4. In the example above, there is a 1:1: mapping for GPU:DPU. However, referring to FIG. 2.2, GPU 1 (226), GPU 2 (228), GPU 3 (230) and GPU 4 (232) all use the checkpoint target presented by DPU 9 (216) (i.e., cache 1 (220)). In the latter example, there is a N:1 mapping for GPU:DPU. In this example, DPU 9 (216) may present four checkpoint targets (e.g., different locations within the cache) or may present a single checkpoint target (i.e., the cache).

The manner in which the mapping between GPU and DPU is configured may be performed by any known or later discovered method or process without departing from the invention.

Once the method shown in FIG. 1.3 has been completed, the GPUs may store checkpoint data within the checkpoint targets (i.e., the caches in the mapped DPUs). Additional detail about the storage of the checkpoint data in the caches in provided in FIG. 1.4.

FIG. 1.4 shows a flowchart of a method for generating and storing checkpoint data in a cache in accordance with one or more embodiments of the invention. The method shown in FIG. 1.4 may occur at any point after the GPU has started execution of an AI workload. All or a portion of the method shown in FIG. 1.4 may be performed by the GPUs. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 110, a checkpoint command is received by the GPU. The checkpoint command specifies that the GPU is to initiate synchronization to a checkpoint. In other embodiments, instead of receiving a checkpoint command, the AI workload itself has specified checkpoints (i.e., the checkpoints are included in the AI workload code).

In step 112, the GPU initiates synchronization to a checkpoint. More specifically, the GPU continues execution of the AI workload until it reaches a synchronization point at which point it pauses execution. In many AI model training implementations, the AI workload on the GPU is one of a set of AI workloads that are concurrently executing on separate GPUs in the server. In such cases, all GPUs in the server that are related to the same AI model training need to be paused at the same synchronization point so that they can all generate checkpoint data at the same point in the AI model training (e.g., for the same epoch). To that end, even when the GPU (i.e., the GPU performing the method in FIG. 1.4) has reached a synchronization point, it cannot proceed to gather checkpoint data until all other GPUs that are also involved in the AI model training have also reached the synchronization point. When all of the aforementioned GPUs reach the synchronization point, the synchronization is deemed to be completed. To determine whether all the related GPUs have reached the synchronization point, the GPUs (e.g., 142, 144, 146, 148, 150, 152, 154, 156) may communicate with each other using the PCIe fabric (158) or using another point-to-point communication fabric (not shown) without departing from the invention.

Continuing with the discussion in FIG. 1.4, accordingly, in step 114, a determination is made about whether the synchronization of the aforementioned GPUs has completed. If synchronization has completed, then the process proceeds to step 118; otherwise, the process proceeds to step 116.

In step 116, the GPU continues to wait until the synchronization has completed.

In step 118, once synchronization has completed, the GPU gathers checkpoint data. The checkpoint data corresponds to the state of various parameters in the AI model that is being trained as well as any other data that may used in the event that the AI model training needs to be restarted from the synchronization point using the checkpoint data. The size of the checkpoint data may be very large, e.g., 40 GB. The invention is not limited to checkpoint data with a 40 GB size.

In step 120, the checkpoint data is transmitted to the cache in the mapped DPU (i.e., it is transmitted to the checkpoint target that was presented by the mapped DPU). The checkpoint data is transmitted via the PCIe fabric using any known or later discovered communication and/or storage protocol. Once such protocol that may be used is Direct Memory Access (DMA), where the checkpoint target is presented as a DMA target.

In step 122, a determination is made about whether all of the checkpoint data has been transferred to the checkpoint target. Once the checkpoint data has been transferred to the checkpoint target, the process proceeds to step 124.

In step 124, the GPU resumes execution of the AI workload. In one or more embodiments, the GPU may wait until all other GPUs executing AI workloads for the same AI model training has also completed the transfer of their checkpoint data before resuming execution. Upon completing the method in FIG. 1.4, the GPU is able to resume execution of the AI workload even though the checkpoint data is not stored in the storage system.

The method shown in FIG. 1.4 may be performed concurrently by all other GPUs in the server that are executing an AI workload that is related to the same AI model training. Further, all or a portion of the method shown in FIG. 1.4 may be repeated each time a synchronization point is reached.

FIG. 1.5 shows a flowchart of a method for transmitting checkpoint data from a cache to a storage system in accordance with one or more embodiments of the invention. All or a portion of the method shown in FIG. 1.5 may be performed by the DPUs. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 130, the checkpoint data is received in the cache of the DPU. The checkpoint data is the checkpoint data that was transmitted from the GPU in step 120 in FIG. 1.4.

In step 132, a determination is made about whether the checkpoint data needs to be modified prior to its transmission to the storage system. If the checkpoint data is to be modified, the process proceeds to step 136; otherwise the process proceeds to step 134.

In step 134, when the checkpoint data does need to be modified, transmission of the checkpoint data to the storage system via the scale out network (see e.g., FIG. 1.2) or the storage network (see e.g., FIG. 2.2) is initiated. The checkpoint data may be transmitted to the storage system using any known or later discovered communication and/or storage protocols. Examples of such protocols are Network File System (NSF) protocol and Remote Data Memory Access (RDMA) over Converged Ethernet (RoCE). The invention is not limited to the aforementioned protocols.

When the checkpoint data is to be modified, then in step 136, the checkpoint data is modified to obtain modified checkpoint data. The modification may include deduplication, compression, tagging, encryption, or any combination thereof. Further, the format of the checkpoint data may also be modified. For example, the checkpoint data may be in the form of a file or set of files while the storage system may be an object store. In this example, the checkpoint data is converted from files into objects. In another example, the checkpoint data may be converted to a type suitable for storage in a block storage array. In another example, the checkpoint data may be converted to a type suitable for storage in a persistent storage sub-system. Those skilled in the art will appreciate that one or more of the aforementioned modifications may be performed on the checkpoint data without departing from the invention. Further, different and/or additional modifications other than those listed above may be applied to the checkpoint data without departing from the invention.

In step 138, transmission of the modified checkpoint data to the storage system via the scale out network (see e.g., FIG. 1.2) or the storage network (see e.g., FIG. 2.2) is initiated. The modified checkpoint data may be transmitted to the storage system using any known or later discovered communication and/or storage protocols. Examples of such protocols are Network File System (NSF) protocol and Remote Data Memory Access (RDMA) over Converged Ethernet (RoCE). The invention is not limited to the aforementioned protocols.

In step 140, a determination is made about whether the transfer of the checkpoint data (from step 134) or the modified checkpoint data (from step 138) is complete. Depending on the size of the checkpoint data, the bit rate of the network connection (or network path) between the DPU and the storage system, and the bit rate (or I/O storage rate) of the storage system, the amount of time required to complete transmission of the checkpoint data or the modified checkpoint data may be orders of magnitude longer than the time it took to transfer the checkpoint data from the GPU to the DPU.

Further, in the system shown in FIG. 1.2, the DPUs handle both storage and non-storage traffic. In such implementations, the DPU may prioritize non-storage traffic (e.g., communications between GPUs in the server with GPUs in other servers). Accordingly, depending on the amount of non-storage traffic, the completion of the transmission of the checkpoint data (or modified checkpoint data) may be further delayed.

In step 142, the DPU may optionally obtain training data (or data for AI inferencing) from the storage system for the next epoch.

In one or more embodiments of the invention, the method shown in FIG. 1.5 is performed by each of the DPUs in the server concurrently. Alternatively, each of the DPUs may perform the method shown in FIG. 1.5 on another schedule without departing from the invention.

The method shown in FIG. 1.5 may be performed by a DPU (e.g., DPU 1 (110)) while the mapped GPU (e.g., GPU 1 (142)) is executing the AI workload. The staged transmission of the checkpoint data (or modified checkpoint data) to the storage system minimizes (or substantially reduces) the time that the GPU is idle (or otherwise not executing the AI workload).

The prior described embodiment is relates to a GPU:DPU mapping of 1:1. However, in another embodiment, the GPU:DPU mapping may be N:1. The system shown in FIGS. 2.1 and 2.2 describe additional details of this embodiment.

Turning to FIG. 2.1, FIG. 2.1 shows a system in accordance with one or more embodiments. The system includes one or more clients (100), a storage system (102), one or more servers (e.g., server A (106A), server N (106N)), a scale out network (201), and a storage network (203). The system may include additional, fewer, and/or different components without departing from the scope of the invention. The components shown in FIG. 2.1 have the same or substantially the same functionality as the liked named components in FIG. 1.1. However, in FIG. 1.1, the scale out network (104) handles all communication traffic between the components in the system. Accordingly, the scale out network (104) handles both storage traffic (i.e., network traffic between the storage system (102) and the servers (106A, 106N)) as well as all other non-storage traffic (e.g., communications between the servers (106A, 106N). In the system in FIGS. 1.1 and 1.2, the DPUs (e.g., 110, 112, 114, 116, 118, 120, 122, 124) include functionality to prioritize the transmission of non-storage traffic over storage traffic. For example, if a GPU (e.g., GPU 1 (142)) is attempting to send non-storage traffic to a GPU (referred to as a target GPU (not shown)) in another server (106) connected over the scale out network, then the DPU (e.g., DPU 1 (110)) will prioritize the sending of the non-storage traffic the target GPU over storage traffic (e.g., network traffic transmitting the checkpoint data to the storage system).

In contrast, the system in FIG. 2.1 segregates the storage traffic from the non-storage traffic by using two different networks. The scale out network (201) is used to transmit non-storage traffic, while the storage network (203) (which may also be a scale out network or any other type of network) only transmits storage traffic. In one embodiment of the invention, to enable the use of the two distinct networks, the architecture of the servers may be modified. One such embodiment of a modified server is shown in FIG. 2.2. Those skilled in the art will appreciate that while FIG. 2.2 shows one embodiment of a modified server architecture, other modified server architectures may be used without departing from the invention.

FIG. 2.2 shows system in accordance with one or more embodiments of the invention. More specifically, FIG. 2.2 shows additional details about servers (e.g., 205) in accordance with one or more embodiment of the invention.

The server (205) includes a first set of DPUs (e.g., 200, 202, 204, 206, 208, 210, 212, 214) that are operatively connected to the scale out network (201) and to the set of GPUs (e.g., 226, 228, 230, 232, 234, 236, 238, 240). The server (205) includes a second set of DPUs (e.g., 216, 218) that are operatively connected to the storage network (203) and the GPUs (e.g., 226, 228, 230, 232, 234, 236, 238, 240). The first set of DPUs and the second set of DPUs communicate with the GPUs via a PCIe fabric (242). However, the first set of DPUs (e.g., 200, 202, 204, 206, 208, 210, 212, 214) is used to manage non-storage traffic between the GPUs (e.g., 226, 228, 230, 232, 234, 236, 238, 240) and components external to the server (205) (e.g., GPUs (not shown) in other servers (106)). The second set of DPUs (e.g., 216, 218) have the same or substantially the same functionality as the DPUs (e.g., 110, 112, 114, 116, 118, 120, 122, 124) in FIG. 1.2. More specifically, the second set of DPUs includes a local cache (e.g., 220, 222) that is used to temporarily store checkpoint data (see e.g., FIGS. 1.4 and 1.5) and data for AI model training and/or AI inferencing (see e.g., FIGS. 4.1 and 4.2). However, the second set of DPUs (e.g., 216, 218) have an 1:N mapping with GPUs (e.g., 226, 228, 230, 232, 234, 236, 238, 240) while the DPUs in FIG. 1.2 have a 1:1 mapping with GPUs. For example, in FIG. 2.2, GPU 1 (226), GPU 2 (228), GPU 3 (230), and GPU 4 (232) are mapped to DPU 9 (216). Once mapped, the checkpoint data and/or the data for model training and/or AI inferencing may be stored in cache 1 (220). Because of the 1:N mapping between DPU and GPUs, the size of cache 1 is greater than the size of the cache (e.g., cache 1 (126) for a DPU to that mapped to a single GPU (e.g., when only GPU 1 (142) is mapped to DPU 1 (110)). As discussed above, the size of the cache (e.g., 220,

224) must be sized to accommodate at least the amount of checkpoint data (which may or may not be compressed).

In addition to including local caches, the second set of DPUs (e.g., 220, 224) are operatively connected to the storage system (102) via the store network (203) and only handle storage traffic. In this manner, there is no contention between the storage traffic and the non-storage traffic associated with the server (and components therein).

The remaining components in FIG. 2.2. have the same or substantially the same functionality as the liked named components in FIGS. 1.2 and 2.1.

While FIG. 2.2 shows a first set of DPUs (e.g., 200, 202, 204, 206, 208, 210, 212, 214) being used for communication of non-storage traffic, one or more of the DPUs may be replaced with network interface cards (NICs) without departing from the invention.

Those skilled in the art will appreciate that one or more servers shown in FIG. 1.2 and may be combined with one or more servers shown in FIG. 2.2 in a single system without departing from the invention.

ToR Switch Caching

In one or more embodiments, instead of staging the checkpoint data with a caches in the server (e.g., cache 1 (126) in FIG. 1.2, cache 1 (220) in FIG. 2.2), the checkpoint data may be staged in the cache (or memory) of one or more ToR switches in the server rack in which the server hosting the GPUs is located. Accordingly, instead of caching the checkpoint data at the DPU level or server level (see e.g., FIG. 2.2), the checkpoint data is cached at the server rack level. While transmission of the checkpoint data to the ToR switch requires two hops (e.g., GPU→DPU (or NIC)→ToR Switch), the effective bit rate for these two hops is typically substantially higher than the bit rate (I/O storage rate) of the storage system.

Turning to FIG. 3.1, FIG. 3.1 shows a system in accordance with one or more embodiments. More specifically, the system shown in FIG. 3.1 relates to an embodiment in which checkpoint data, the data for AI model training and/or AI inferencing is stored in one or more ToR switches (e.g., 302, 304) in the server racks (e.g., 300A, 300N). In this embodiment, the ToR switches, instead of the DPUs (see e.g., FIGS. 1.2 and 2.2), are used to store checkpoint data, the data for AI model training and/or AI inferencing.

In one embodiment of the invention, the servers (e.g., 306A, 306B, 308C, 308D) are housed (or otherwise located) in server racks (e.g., 300A, 300B). The servers in the server racks are directly connected to the one or more ToR switches (e.g., 302, 304) in the corresponding server racks. The ToR switches facilitate inter-server communication for servers within the server rack as well as communication between the servers in the server rack and external components (e.g., other servers in other server racks, the scale out network (104), etc.).

In this embodiment, the GPUs send checkpoint data to the ToR switches via the DPUs. Said another way, the DPUs in the servers facilitate the transfer of the checkpoint data but do not cache the checkpoint data. As a result, the DPUs do not need to include large local caches (as compared to embodiments shown in FIGS. 1.2 and 2.2); rather, the ToR switches need to include the larger caches. Additional detail of this embodiment is shown in FIG. 3.2.

The remaining components in FIG. 3.1 have the same or substantially the same functionality as the liked named components in FIGS. 1.1, 1.2, 2.1, and 2.2.

FIG. 3.2 shows system in accordance with one or more embodiments of the invention. More specifically, FIG. 3.2 shows additional detail of a server (306A) in a server rack (307). Turning to FIG. 3.2, the server (306A) includes a set of DPUs (e.g., 310, 312, 314, 316, 318, 320, 322, 324) operatively connected to a set of GPUs (e.g., 326, 328, 330, 332, 334, 336, 338, 340) via a PCIe fabric (309). The DPUs and GPUs may be mapped 1:1 or 1:N depending on the implementation of embodiments of the invention.

Continuing with the discussion of FIG. 3.2, each server rack (e.g., 307) may include one or more ToR switches (e.g., 342, 344). Further, of the ToR switches in the server rack may include a local cache (e.g., 346, 348) that is used to store checkpoint data and data for AI model training and/or AI inferencing. The size of the cache in a given ToR switch is based on how much checkpoint data and data for AI model training and/or AI inferencing (which may or may not be compressed) is to be stored in the cache. Further, unlike the caches in the DPU described in FIGS. 1.2 and 2.2, the cache in the ToR switches may store checkpoint data and data for AI model training and/or AI inferencing for GPUs that are located in different servers (e.g., 306A, 306B) in a given server rack (307).

The ToR switches include functionality to perform all or some of the methods shown in FIGS. 1.3, 1.4, 1.5, 3.3, 4.0, and 4.1.

Continuing with the discussion of FIG. 3.2, all other like name components in FIG. 3.2 have the same or substantially the same functionality as described in FIGS. 1.2, 2.2, and 3.1.

FIG. 3.3 shows a flowchart of a method for generating and storing checkpoint data in a cache in accordance with one or more embodiments of the invention. All or a portion of the method shown in FIG. 3.3 may be performed by the GPU. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 300, a checkpoint command is received by the GPU. The checkpoint command specifies that the GPU is to initiate synchronization to a checkpoint. In other embodiments, instead of receiving a checkpoint command, the AI workload itself has specified checkpoints (i.e., the checkpoints are included in the AI workload code).

In step 302, the GPU initiates synchronization to a checkpoint. More specifically, the GPU continues execution of the AI workload until it reaches a synchronization point at which point it pauses execution. In many AI model training implementations, the AI workload on the GPU is one of a set of AI workloads that are concurrently executing on separate GPUs in the server. In such cases, all GPUs in the server that are related to the same AI model training need to be paused at the same synchronization point so that they can all generate checkpoint data at the same point in the AI model training (e.g., for the same epoch). To that end, even when the GPU (i.e., the GPU performing the method in FIG. 1.4) has reached a synchronization point, it cannot proceed to gather checkpoint data until all other GPUs that are also involved in the AI model training have also reached the synchronization point. When all of the aforementioned GPUs reach the synchronization point, the synchronization is deemed to be completed. To determine whether all the related GPUs have reached the synchronization point, the GPUs (e.g., 326, 328, 330, 332, 334, 336, 338, 340) may communicate with each other using the PCIe fabric (309) or using another point-to-point communication fabric (not shown) without departing from the invention.

Continuing with the discussion in FIG. 3.3, accordingly, in step 304, a determination is made about whether the synchronization of the aforementioned GPUs has completed. If synchronization has completed, then the process proceeds to step 308; otherwise, the process proceeds to step 116.

In step 306, the GPU continues to wait until the synchronization has completed.

In step 308, once synchronization has completed, the GPU gathers checkpoint data. The checkpoint data corresponds to the state of various parameters in the AI model that is being trained as well as any other data that may used in the event that the AI model training needs to be restarted from the synchronization point using the checkpoint data. The size of the checkpoint data may be very large, e.g., 40 GB. The invention is not limited to checkpoint data with a 40 GB size.

In step 310, the checkpoint data is transmitted via a DPU (or NIC) to the cache in the ToR Switch to which is was previously mapped (i.e., it is transmitted to the checkpoint target in the ToR Switch that was previously presented by the DPU or NIC). The checkpoint data is transmitted via two hops to the ToR Switch (i.e., the PCIe fabric and the physical connection between the server and the ToR switch) using any known or later discovered communication and/or storage protocol. Once such protocol that may be used RoCE.

In step 312, a determination is made about whether all of the checkpoint data has been transferred to the checkpoint target. Once the checkpoint data has been transferred to the checkpoint target, the process proceeds to step 314.

In step 314, the GPU resumes execution of the AI workload. In one or more embodiments, the GPU may wait until all other GPUs executing AI workloads for the same AI model training has also completed the transfer of their checkpoint data before resuming execution. Upon completing the method in FIG. 3.3, the GPU is able to resume execution of the AI workload even though the checkpoint data is not stored in the storage system.

The method shown in FIG. 3.3 may be performed concurrently by all other GPUs in the server that are executing an AI workload that is related to the same AI model training. Further, all or a portion of the method shown in FIG. 3.3 may be repeated each time a synchronization point is reached.

Once the checkpoint data has been stage (or stored) in the cache in the ToR Switch. The ToR switch may perform substantially the same method shown in FIG. 1.5 to transmit the checkpoint data (or modified checkpoint data) to the storage system.

Read Ahead

As discussed above, the DPU may be idle (or relatively idle) while the GPU is executing the AI workload. In one or more embodiments, during this period of time, the DPU includes functionality to proactively obtain data for the next epoch in the AI model training (or from AI inferencing). However, in order to effectively obtain the data (i.e., obtain data that will be ultimately used by the GPU when executing the AI workload), the DPU needs to understand the I/O pattern (also referred to as the access pattern) of the data that the GPU is using during the AI workload execution. If a pattern can be discerned, then the DPU can predict what data the AI workload may need during the next epoch of AI workload execution and then proactively obtain this data and locally store it in its cache. Accordingly, embodiments of the invention enable the DPU to analyze the access patterns related to the data that is used by the GPU when executing the AI workload and then dynamically enable or disable proactive reading of data. In this manner, when the DPU determines an access pattern, the DPU can proactively obtain the data thereby decreasing the idle time of the GPU; however, if the access pattern becomes random (i.e., the DPU cannot predict the data that the GPU needs for the next epoch), then the DPU may disable the proactive reading (i.e., disable read ahead mode) until such time that an access pattern can ascertained. This approach, in one or more embodiments, enables the DPU to assist when it is able to and not negatively impact the system (i.e. by performing proactive reading of data that the GPU does not need) when it is unable to assist.

In one or more embodiments of the invention, the ToR switch, instead of the DPU, may be used to determine the access pattern and, when an access pattern is determined, the ToR switch may proactively obtain the data from the storage system.

Turning to FIG. 4.1, FIG. 4.1 shows a flowchart of a method for implementing read ahead in a system in accordance with one or more embodiments of the invention. All or a portion of the method shown in FIG. 4.1 may be performed by the DPUs or ToR switches. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 4.1 may be performed by the DPU or ToR switch. Further, all of a portion of the DPUs in a server or ToR switches in a server rack may perform the method shown in FIG. 4.1.

If the DPU that is executing the method in FIG. 4.1 corresponds to a DPU in FIG. 1.2, then the DPU is implementing the method to proactively read data for one GPU that is mapped to the DPU. If the DPU that is executing the method in FIG. 4.1 corresponds to a DPU that is mapped to multiple GPUs (e.g., DPU 9 (216) in FIG. 2.2), then the DPU is performing the method shown in FIG. 4.1 on a per-GPU basis (e.g., for each of GPUs 1-4 (226-232) or for a subset of the aforementioned GPUs). If the method shown in FIG. 4.1 is being performed by a ToR Switch (e.g., ToR Switch 1 (342) in FIG. 3.2)), then the ToR switch performs the method shown in FIG. 4.1 on a per GPU basis for all GPU to which is it mapped. For example, referring to FIG. 3.2, if ToR Switch 1 (342) is mapped to all GPUs in Server A (306A)), then the ToR Switch (346) would implement the method for each of the eight GPUs (or for a subset of the aforementioned GPUs).

In the scenarios in which the DPU or ToR switch is performing the method for multiple GPUs, the DPU or ToR switch may segregate the data for each of GPUs as well the I/O statistics (discussed below) associated with each of the GPUs using any known or later discovered data structure.

Turning to FIG. 4.1, in step 400, analysis mode is enabled.

In step 402, a predetermined amount of data for the AI workload executing on the target GPU is obtained from the storage system using a default access pattern (e.g., a sequential access pattern) and then stored in the cache. If the DPU is executing the method shown in FIG. 4.1, then the data may be stored in the cache of the DPU that is executing the method or it may be stored in another location that is operatively connected to the DPU (e.g., in the cache of ToR switch). Further, if the ToR switch is executing the method shown in FIG. 4.1, then the data may be stored in the cache of the ToR switch that is executing the method or it may be stored in another location that is operatively connected to the ToR Switch (e.g., in the cache of DPU that is operatively connected to the ToR Switch and the GPU that will ultimately use the data during execution of the AI workload).

The size of predetermined amount of data may vary based on the implementation. In one embodiment of the invention, the size of predetermined amount of data corresponds to an amount of data that may be sufficient for the DPU or ToR switch to identify an access pattern (or that there is no predictable access pattern).

While the step 402 may use an initial access pattern that is sequential, embodiments of the invention may use a different initial access pattern without departing from the invention.

In step 404, the I/O statistics associated with the obtained data are analyzed to determine an access pattern. More specifically, after the data has been retrieved and staged in the cache, the DPU or ToR Switch waits until the GPU requests the data. As is discussed in further detail in FIG. 4.2, when the GPU requests data (e.g., issues a file request), the DPU or ToR switch attempts to service this request using the cached data. If the data is present in the cache it is returned and the I/O statistics indicate that data was successfully received from the cache (i.e., there was a cache hit); however, if the data is not present in the cache, then the I/O statistics indicate that the data was not present in the cache (i.e., there was a cache miss).

The I/O statistics are used to determine whether there is a defined access pattern (e.g., sequential, pseudo random, etc.). For example, if the data was obtained using a sequential access pattern and the I/O statistics indicate that there were either: (i) no cache missed or (ii) less than threshold number of cache misses, then a sequential access pattern may be determined.

Even when there are some cache misses, if the overall number of cache misses is below a threshold the DPU or ToR Switch may still determine that the access pattern is sequential. For example, assume that there are 16 file requests and of the 16 request there are 14 cache hits and 2 cache misses (e.g., due to random read requests), then the DPU or ToR switch may still determine that the access pattern is sequential. However, if there are 16 file requests and of the 16 request there are 2 cache hits and 14 cache misses (e.g., due to random read requests), then the DPU or ToR switch may determine that the access pattern is not sequential. The specific number of cache misses that will trigger the latter determination may vary based on the implementation without departing from the technology.

In scenarios in which the access pattern is determined not to be sequential, the I/O statistics (including file requests) can be used to determine whether the access pattern was pseudo-random or if the access pattern is random. Depending on the implementation, DPU or ToR Switch may retain I/O statistics (including file requests) for multiple iterations of FIG. 4.1 in order to ascertain more complex access patterns (e.g., pseudo random access patterns).

Continuing with the discussion of FIG. 4.1, in step 406, a determination is made about whether the access pattern is sequential. If the access pattern is sequential, the process proceeds to step 410; otherwise, the process proceeds to step 408.

In one embodiment of the invention, a sequential access pattern corresponds to reading data sequentially from a file or sequentially from a series of files. In another embodiment of the invention, the sequential access pattern may be an interleaved pattern. The following is an example of an interleaved pattern. In this example, assume that that there are fifteen files (F1, F2, F3, F4, F5, F6, F7, F8, F9, F10, F11, F12, F13, F14, and F15) and that there are five GPUs reading from the same set of files, where each GPU reads every fifth file in the sequence. Thus, GPU 1 reads files F1, F6, F11; GPU 2 reads files F2, F7, F12; GPU 3 reads files F3, F8, F13; GPU 4 reads files F4, F9, F14; and GPU 5 reads files F5, F10, F15.

In step 408, if the access pattern is not a sequential pattern, then a determination is made about whether the access pattern is pseudo-random. If the access pattern is pseudo-random, the process proceeds to step 410; otherwise, the process proceeds to step 416. A pseudo-random pattern is a pattern that may initially appear random but after analyzing more I/O statistics (including file requests) follows a predefined sequence.

The following is an example of a pseudo random pattern. In this example, assume that that there are eighteen files (F1, F2, F3, F4, F5, F6, F7, F8, F9, F10, F11, F12, F13, F14, F15, F16, F17, and F18) and that there are three GPUs reading from the same set of files. In this example, GPU 1 reads files F1, F6, F11 and F16; GPU 2 reads files F2, F7, F12, F17, F2; and GPU 3 reads files F3, F8, F13, F18, and F3.

While the method shown in FIG. 4.1 only discussed two classes of access patterns, additional and/or different access patterns may be considered without departing from the invention.

Further, the determination of whether there is a sequential or pseudo-random access pattern includes scenarios in which, based on the analysis of the I/O statistics, the file requests match a sequential or pseudo-random access pattern (or other predictable access pattern) within the specified thresholds. Said another way, the I/O statistics do not need to support an exact match of a sequential or pseudo-random access pattern (or other predictable access pattern).

Continuing with FIG. 4.1, in step 410, once an access pattern is determined (or verified in scenarios in which the access pattern was determined in a previous iteration of the method), a determination is made about whether read ahead mode is already enabled. If read ahead mode is enabled, the process proceeds to step 414; otherwise the process proceeds to step 412.

Those skilled in the art will appreciate that read ahead mode can continue to be enabled even when the access pattern changes between successive iterations of the method. For example, consider a scenario in which the initial access pattern is assumed to be sequential. When the I/O statistics are reviewed there were 80% cache misses, which indicates that the access pattern is not sequential (see e.g., step 406); however, when the I/O statistics are further reviewed (e.g., in Step 408) it is determined that the access pattern is pseudo-random. Accordingly, even though there was a high cache miss rate, the read ahead mode may still continue to be enabled as a new access pattern has been determined.

Continuing with the discussion of FIG. 4.1, in step 412, when read ahead mode is not enabled (e.g., it was disabled in a prior iteration of the method), the read ahead mode is enabled. If the DPU or ToR switch is mapped to multiple GPUs, then the enablement of the read ahead mode is only for the GPU for which the access pattern was determined and not for all GPUs that are mapped to the DPU or ToR switch.

In step 414, a predetermined amount of data is obtained using the access pattern that was ascertained in Step 406 or Step 408 and stored in the cache (which may be in the DPU or ToR switch, as discussed above). The process then proceeds to step 404 to determine whether the current access pattern that is being used for proactively caching data is still appropriate.

Returning to Step 408, when no predictable access pattern is determined (i.e., the access pattern is random), then in step 416, read ahead mode is disabled. The disabling of the read ahead mode results in the DPU or ToR Switch not proactively obtaining data from the storage system for the AI workload executing on the corresponding GPU.

In step 418, while the read ahead mode is disabled, the DPU or ToR switch awaits additional I/O statistics, which will be primarily file requests. Once sufficient additional I/O statistics are obtained, then the DPU or ToR switch proceeds to step 404 to attempt to ascertain a predictable access pattern and resume proactively caching data based on the predictable access pattern.

In one or more embodiments of the invention, instead of performing step 402 and then determining an access pattern, the DPU or ToR switch may start at step 418 by monitoring the I/O statistics (which would be primarily file requests) and then proceed to step 404 to ascertain whether (or not) there is a predictable access pattern. In such embodiments, the read ahead is initially disabled and only enabled once a predictable access pattern is identified.

FIG. 4.2 shows a flowchart of a method for obtaining training data in a system in accordance with one or more embodiments of the invention. All or a portion of the method shown in FIG. 4.2 may be performed by the GPUs. Other components of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 4.2 is performed by the DPU that is handling file requests for the corresponding GPU. For example, DPU 1 (310) may perform this method when GPU 1 (326) requests data (via a file request (defined below)). The DPU that is performing FIG. 4.2 may, but does not need to, perform the method shown in FIG. 4.1.

Turning to FIG. 4.1, in step 430, the DPU receives a file request from a DPU. The file request may correspond to any request for any amount of data. For example, the file request may specify: (i) a single file, (ii) a set of files; (iii) a portion of a file starting at a specific offset, (iv) portions of a file specified by a file name and a set of offsets, (v) an object, (vi) a set of objects, or any combination thereof.

In step 432, a file is selected from the file request.

In step 434, a determination is made about whether the selected file is in the cache (where the cache is either in the DPU or the ToR switch (depending on the where the data is cached)). If the data is cached, the process proceeds to step 440; otherwise, the process proceeds to step 436.

When there is a cache miss, then in step 436, the file request is sent (via the DPU and/or ToR Switch) to the storage system.

In step 438, the requested file is obtained from the storage system by the DPU.

In step 440, the file is transmitted from the DPU to the GPU.

In step 442, the I/O statistics are updated to reflect whether there was a cache miss (i.e., step 436 is performed) or a cache hit for the file request.

In step 444, a determination is made about whether there are remaining files specified in the file request that need to be obtained. If there are remaining files, the process proceed to step 432; otherwise the process ends.

As the DPUs execute the method shown in FIG. 4.2, the I/O statistics required to ascertain if there are access patterns are collected by the DPU and then used by the DPU or ToR Switch to perform the method in FIG. 4.1.

EXAMPLE

FIG. 5 shows an exemplary scenario for implementing checkpointing and read ahead in a system in accordance with one or more of the previously described embodiments of the invention. The scenario described in FIG. 5 is merely for illustrative purposes and is not intended to limit the scope of the invention.

Turning to FIG. 5, consider a scenario in which the GPU (500) initially sends a file request (510) to the DPU (502). The DPU (502) issues the file request (512) to the storage system (504). In response, the storage system (504) obtains the files and transmits the files to the DPU (502). The DPU in turn transmits the files (516) to the GPU (500). As part of the aforementioned process, the DPU (502) collects I/O statistics (namely the file requests) about the files requested by the GPU (500).

The GPU (500) upon receipt of the requested files executes the AI workload using the files (518). While the GPU (500) is executing the AI workload, the DPU (502) enables read ahead mode (520) and, using the prior collected I/O statistics, determines that the access pattern is sequential (522). In response to this determination, the DPU (502) proactively issues file requests (524) based on the access pattern to the storage system for files that the DPU predicts will be used in the next epoch by the GPU (500) executing the AI workload. The requested files are transmitted by the storage system (504) to the DPU (502) and subsequently stored in the cache (528) in the DPU (502).

At a later point in time, the GPU reaches a synchronization point in its execution of the AI workload and pauses execution of the AI workload (530). The GPU (500) then obtains and transmits the checkpoint data (532) to the DPU (502). The DPU subsequently stores the checkpoint data in its cache (not shown). At this stage, the cache (not shown) in the DPU (502) includes the checkpoint data and the proactively read files.

Once the checkpoint data has been transmitted, the GPU (500) determines which files it needs for the next epoch and sends a corresponding file request (534) to the DPU (502). In this example, the DPU (502) is able to service the entire file request (536) using the files that it has proactively obtained from the storage system and cache while the GPU was executing the AI workload. Upon receipt of the requested files. The GPU resumes execution of the AI workload using these files (540). Concurrently with the execution of the AI workload by the GPU (500), the DPU (502) transmits the checkpoint data (538) to the storage system.

In this example, the DPU is able to improve utilization of the GPU by (i) minimizing the time required to complete the checkpointing process by storing the checkpoint data in its cache (not shown) and (ii) by minimizing the time required to resume execution of the AI workload after the completion of the checkpointing process at the synchronization point by proactively obtaining and caching files that the GPU requires to resume execution of the AI workload.

End of Example

Figure 6:
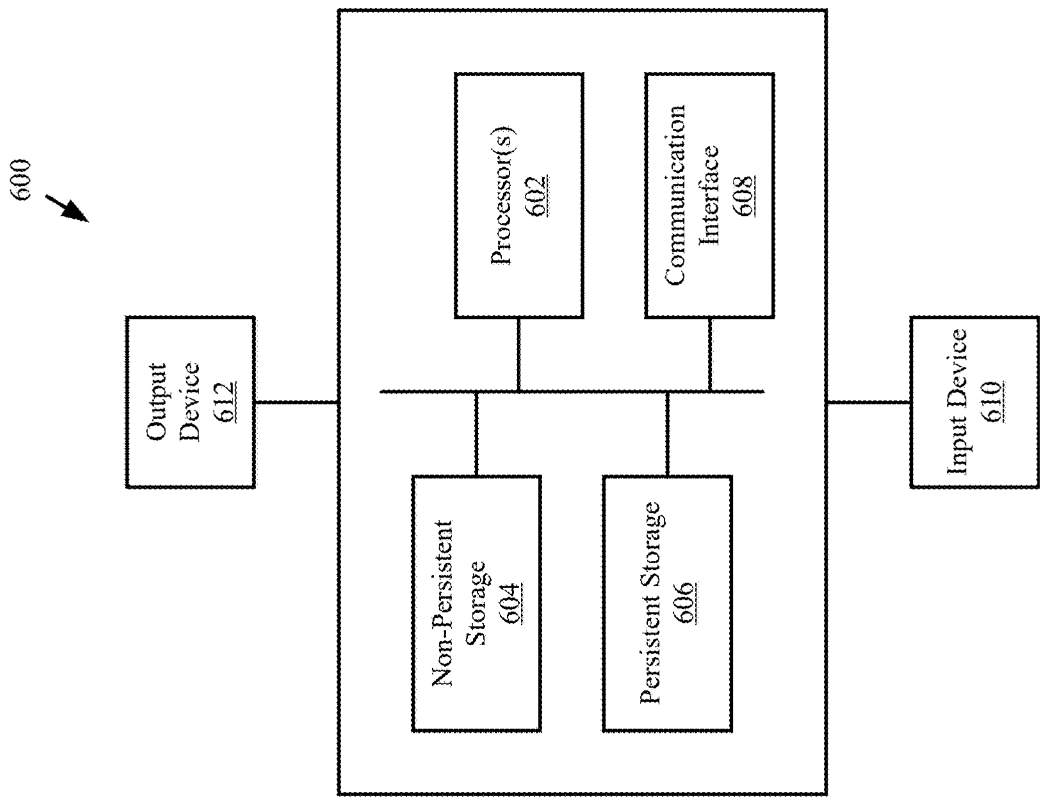
FIG. 6 shows a computing system in accordance with one or more embodiments of the invention.

Embodiments of the disclosure may be implemented using computing devices. Turning to FIG. 6, FIG. 6 shows a diagram of a computing device (600) in accordance with one or more embodiments. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), input devices (610), output devices (612), and numerous other elements (not shown) and functionalities. Each of these components is described below.

In one embodiment, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. The communication interface (608) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment, the computing device (600) may include one or more output devices (612), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (610, 612) may be locally or remotely connected to the computer processor(s) (602), non-persistent storage (604), and persistent storage (606). Many diverse types of computing devices exist, and the aforementioned input and output device(s) (610, 612) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments will now be described with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing checkpointing, comprising:

obtaining, by a general processing unit (GPU), checkpoint data associated with a workload;

transferring, by the GPU, the checkpoint data to a cache in a top of rack (ToR) switch via a data processing unit (DPU), wherein the GPU and the DPU and located on a physical server and the ToR switch is operatively connected to the physical server; and resuming, by the GPU, execution of the workload after the transferring, wherein the ToR switch transmits the checkpoint data to a storage system that is external to the physical server and the ToR switch.

2. The method of claim 1, further comprising:

obtaining, by a second GPU, second checkpoint data associated with a second workload;

transferring the second checkpoint data to the cache in the ToR switch, wherein the second GPU is located on the physical server; and resuming executing of the second workload on the second GPU after the transferring, wherein the ToR switch transmits the second checkpoint data to the storage system.

3. The method of claim 1, further comprising:

prior to obtaining the checkpoint data:

mapping the GPU to the ToR switch.

4. The method of claim 3, wherein the DPU presents a checkpoint target in the ToR switch to the GPU, and wherein mapping the GPU to the Tor Switch comprises configuring the GPU to use the checkpoint target to transfer the checkpoint data to the ToR switch via the DPU.

5. The method of claim 4, wherein the checkpoint target is a storage target.

6. The method of claim 4, wherein the storage target is located in volatile memory or non-volatile storage in the ToR switch.

7. The method of claim 3, wherein there is a 1:1 mapping between the GPU and the ToR switch.

8. The method of claim 1, wherein the GPU and the DPU are connected via a Peripheral Component Interconnect Express (PCIe) fabric in the physical server or via a Compute Express Link (CXL) bus in the physical server.

9. The method of claim 1, wherein the checkpoint data is transmitted to the storage system via a scale out network.

10. The method of claim 1, wherein the workload is an artificial intelligence (AI) workload.

11. The method of claim 1, wherein at least a portion of the checkpoint data is transmitted to the storage system after the GPU has resumed execution of the workload.

12. The method of claim 1, wherein, prior to transmitting the checkpoint data to the storage system, the ToR switch performs a modification operation on the checkpoint data, and wherein the checkpoint data is transferred to the storage system after the ToR switch performs the modification operation.

13. The method of claim 12, wherein the modification operation is at least one of type conversion, compression, encryption, deduplication, and tagging.

14. The method of claim 13, wherein the type conversion comprises at least one of:

converting the checkpoint data to a type suitable for storage in an object store, converting the checkpoint data to a type suitable for storage in a file store, converting the checkpoint data to a type suitable for storage in a block storage array, and converting the checkpoint data to a type suitable for storage on a persistent storage sub-system.

15. The method of claim 1, further comprising:

obtaining, by a second GPU, second checkpoint data associated with a second workload;

transferring the second checkpoint data to a second cache in a second ToR switch, wherein the second GPU and the second DPU are located on the physical server; and resuming executing of the second workload on the second GPU after the transferring, wherein the second ToR switch transmits the second checkpoint data to the storage system.

16. The method of claim 15, wherein a size of the cache is 50% of a size of a memory in the GPU.

17. A physical server, comprising:

a plurality of graphics processing units (GPUs), a plurality of data processing units (DPUs), a peripheral connection interface express (PCIe) fabric connecting the plurality of GPUs and the plurality of DPUs, wherein each of the plurality of GPUs is configured to obtain checkpoint data associated with an artificial intelligence (AI) workload and transmit, via one of the plurality of DPUs, the checkpoint data to a corresponding mapped cache in a Top of Rack (ToR) switch, wherein the ToR Switch is configured to transmit the checkpoint data via a scale out network to a storage system that is external to the physical server and the ToR Switch.

18. The physical server of claim 17, wherein there is a 1:1 mapping between each of the plurality of GPUs and each of the plurality of DPUs.

19. A system comprising:

a physical server, comprising:

a plurality of graphics processing units (GPUs), a plurality of data processing units (DPUs), a peripheral connection interface express (PCIe) fabric connecting the plurality of GPUs and the plurality of DPUs, wherein each of the plurality of GPUs is configured to obtain checkpoint data associated with an artificial intelligence (AI) workload and transmit, via one of the plurality of DPUs, the checkpoint data to a corresponding mapped cache in a Top of Rack (ToR) switch, and the ToR Switch is configured to transmit the checkpoint data via a scale out network to a storage system that is external to the physical server and the ToR Switch, wherein the ToR Switch and the physical server are in a server rack.

20. The system of claim 19, further comprising:

a second physical server in the server rack;

wherein the ToR Switch is configured to receive second checkpoint data associated with the AI workload from a second GPU, via a second DPU, on the second physical server.

* * * * *